US007620736B2

(12) United States Patent
Westfall

(10) Patent No.: US 7,620,736 B2
(45) Date of Patent: Nov. 17, 2009

(54) NETWORK TOPOLOGY HAVING NODES INTERCONNECTED BY EXTENDED DIAGONAL LINKS

(75) Inventor: Ron Westfall, North Vancouver (CA)

(73) Assignee: Cray Canada Corporation, Burnaby (CA)

( * ) Notice: Subject to any disclaimer, the term of this patent is extended or adjusted under 35 U.S.C. 154(b) by 1262 days.

(21) Appl. No.: 10/636,740

(22) Filed: Aug. 8, 2003

(65) Prior Publication Data

US 2005/0044195 A1     Feb. 24, 2005

(51) Int. Cl.
*G06F 15/16*     (2006.01)
(52) U.S. Cl. .................. 709/249; 709/223; 370/254; 370/406; 370/407; 370/408
(58) Field of Classification Search .......... 709/239, 709/238, 249, 223; 370/255, 254, 406, 407, 370/408; 714/6; 712/11; 710/316
See application file for complete search history.

(56) References Cited

U.S. PATENT DOCUMENTS

| | | | | |
|---|---|---|---|---|
| 5,099,235 | A | | 3/1992 | Crookshanks ............... 340/826 |
| 5,548,773 | A | * | 8/1996 | Kemeny et al. ............... 712/11 |
| 5,689,646 | A | * | 11/1997 | Thorson ..................... 709/239 |
| 5,689,661 | A | * | 11/1997 | Hayashi et al. ............. 710/316 |
| 5,720,025 | A | * | 2/1998 | Wilkes et al. .................. 714/6 |
| 5,970,232 | A | * | 10/1999 | Passint et al. ................ 709/238 |
| 6,138,167 | A | | 10/2000 | Heller et al. |
| 6,389,130 | B1 | | 5/2002 | Shenoda et al. ........ 379/221.08 |
| 7,027,413 | B2 | * | 4/2006 | Lee et al. ..................... 370/255 |
| 7,072,976 | B2 | * | 7/2006 | Lee ............................. 709/238 |
| 2001/0003188 | A1 | | 6/2001 | Kikinis |
| 2002/0108123 | A1 | | 8/2002 | Colak et al. ................. 725/123 |
| 2002/0124269 | A1 | | 9/2002 | Colak et al. ................. 725/149 |
| 2003/0135710 | A1 | | 7/2003 | Farwell et al. ................ 712/10 |

FOREIGN PATENT DOCUMENTS

| | | |
|---|---|---|
| EP | 0 950 961 A2 | 10/1999 |
| EP | 0 950 961 A3 | 3/2000 |
| WO | WO 95/30315 | 11/1995 |

OTHER PUBLICATIONS

Fat Trees; *Universal Networks for hardware Efficient Supercomputing:* C E Leiserson; *IEEE Transactions on Computers* vol. C-34, No. 10, p. 892-901; Oct. 1985.
Badouel, D et al. *An Analysis of Connectivity of k-ary n-cube m-diage Interconnection Networks;* CSRI Technical Report #258, University of Toronto; May 1992.

* cited by examiner

*Primary Examiner*—Jungwon Chang
(74) *Attorney, Agent, or Firm*—Oyen Wiggs Green & Mutala LLP

(57) ABSTRACT

A network topology links nodes with Cartesian and diagonal links. The diagonal links may be uniformly-extending iso-delta diagonal links of different lengths. The network topology may be used to provide data communication between processors or groups of processors in a high-performance computer system.

20 Claims, 21 Drawing Sheets

⊠ = Node

NETWORK TOPOLOGY HAVING NODES INTERCONNECTED BY EXTENDED DIAGONAL LINKS

TECHNICAL FIELD

The invention relates to computers and data communication networks. The invention has particular application in networks for carrying communications between processors of multi-processor computers.

BACKGROUND

High performance computers (some of which are referred to as supercomputers) are used to perform complex calculations. Such computers are typically used to run applications which perform extremely large numbers of calculations and/or process very large data sets. A high performance computer is required where a common computer cannot complete the required calculations in a practical interval. For example, a 7-day weather forecast is not useful if it takes 8 days of calculation to generate.

There are a wide variety of scientific and commercial applications that can benefit from the ability of high performance computers to rapidly perform vast numbers of calculations. Some examples of such applications include performing simulations of natural phenomena, data mining, engineering analysis of complicated structures, crash simulations, weather forecasting, cryptanalysis, and so on.

In general, high performance computers can be made faster by one or both of two basic design strategies: use faster CPU(s) or use more CPUs. Because of the relatively small market for high performance computers it is generally not cost effective to design and build unusually fast CPUs for use in high performance computers. Designing and testing a CPU is a very expensive undertaking that can typically be justified only if there are prospects for selling large quantities of the CPU. Further, device physics limitations make dramatic advances in CPU performance difficult to achieve.

Current design strategies for high performance computers involve providing large numbers of CPUs operating in parallel. The CPUs can be commodity off-the-shelf CPUs. FIG. 1 shows a computer system 10 comprising a number of compute sub-systems 11 connected to a shared communication network 14. Each compute sub-system 11 comprises a CPU 12 and memory 13.

There are numerous possible variations on the basic design of system 10. For example, in some cases each compute sub-system 11 comprises more than one CPU 12 that share memory 13. Such computer sub-systems are referred to as Symmetric Multi-Processor (SMP) systems.

The way in which compute sub-systems are packaged for purchase and installation can be important to purchasers of such systems. FIG. 2 illustrates a computer system 10A wherein, two or more compute sub-systems 11 are packaged in separate chassis 20. Like other computers, high performance computers typically have mass storage to hold data. There are many possible ways of attaching mass storage, such as disk storage to a computer system as shown in one of FIGS. 1 and 2.

The topology of shared communication network 14 plays a significant role in the performance of a computer system as shown in FIG. 1 or 2. Network 14 may provide both internal communication (i.e. communication between compute sub-systems 11) and external communication (i.e. communication between a compute sub-system 11 and some computer or device external to computer system 10) or separate networks may be provided for internal and external communications.

External communication is predominantly implemented using a local area network (LAN). If the LAN is connected via a router to the Internet, it is also considered to be a component of a wide area network (WAN). It is common for LANs to be implemented using TCP/IP over Ethernet.

Internal communication might be administrative in nature, or it might represent communication internal to a high performance computing application. Administrative communication has no special requirements, so LAN technology would be an appropriate solution for this type of communication. The internal communication of a high performance computing application requires further consideration.

High performance computing applications are designed to split up a large complex problem into a multiplicity of smaller sub-problems that can be allocated to the available compute sub-systems 11. Some of these applications are considered to be "embarrassingly parallel", because each sub-problem can be solved independently. Little or no communication is required between the instances of application software solving the various sub-problems. Image rendering of computer-generated movie frames is one example of an "embarrassingly parallel" application, because each frame can be rendered independently. Such applications place no special requirements on shared communication network 14. Cluster computers (a sub-category of high performance computers) with TCP/IP over Ethernet networks are often used to solve "embarrassingly parallel" problems.

In the case of other high performance computing applications, it is not possible to solve the sub-problems independently. Moderate to extensive communication is required to solve the sub-problems. For example, a stellar motion simulation of the $10^8$ stars inside the Milky Way galaxy over the course of 5 billion years might be done by allocating the sub-problem of calculating the motions of $10^4$ stars to each of the 10,000 CPUs in a high performance computer. Since the motion of each star is determined by the total gravitational attraction of all the other stars in the galaxy it is necessary for the CPUs to exchange stellar location data periodically so that gravitational forces can be calculated. This could require on the order of $5 \times 10^{14}$ to $5 \times 10^8$ messages to be communicated over a single execution of the application. Such an application requires shared communication network 14 to handle large volumes of messages within a reasonable time interval. This requires network 14 to have a large bandwidth.

The topology of the communication network 14 in a high performance computer may provide multiple paths between any given source and destination. Communication network 14 may be configurable to support load balancing message traffic across the multiple paths.

Apart from measuring the bandwidth of individual links, the bandwidth of network 14 may be characterized by a metric called the minimum bi-section bandwidth. A bi-section of a network is a division of the network into two halves, each containing half of the compute sub-systems 11. In a worst case scenario where all of the senders are in one half of the network and the receivers are in the other half of the network, all communication crosses the bi-section. The bi-section bandwidth is the aggregate bandwidth of all the data links that cross the bi-section. If we allow the bi-section to be arbitrarily placed, the minimum bi-section bandwidth arises for the bi-section with the smallest bi-section bandwidth.

The performance of a multi-processor computer system is limited by the communication latency, which is the time it takes to send a message between any two CPUs. Communication latency has two components: the inherent latency of the communication network 14 when no other message traffic is present, and the additional delays incurred by the presence of other message traffic. The inherent latency of communication network 14 depends upon factors including: the topology of network 14 (i.e. the number of switches and data links that must be traversed between sender and receiver), the latency to transmit a message from the sender, the latency to pass a message from one end of a data link to the other, the latency to pass a message through intervening switches, and the latency to accept a message at the receiver.

There are many applications in which performance is determined by the longest time taken for one CPU in the computer system to deliver a result to another CPU. As a result, high communication latency between a pair of CPUs can slow down an entire application. Unlike other communication networks and the applications that operate on those networks, the performance of high performance computing applications is determined by the maximum latency of the communication network 14, not the average latency.

The performance of applications which solve problems iteratively can be limited by maximum latency. For example, the above stellar motion simulation might require processors to exchange stellar positions and velocities with other processors at the end of each simulated 1000 year interval. It is most convenient to exchange stellar position data after the position of each star has been calculated as of the end of the interval currently being considered. Like a motion picture film, the evolution of the Milky Way may be simulated by determining stellar positions for each of a succession of $5 \times 10^6$ discrete times separated by 1000 year intervals.

If the simulation is being run on a computer system having 10,000 CPUs then any single CPU may need to receive stellar position data from the other 9,999 CPUs before it can start the calculations for the next interval. The CPU is forced to wait to receive the last to come of the stellar position data from the other CPUs. The delay in receiving the last data is due to two factors: the time taken by the responsible CPU to calculate the last data and the time taken to communicate that data to the other CPUs. This constraint on performance is difficult to avoid when an application computes iteratively with communication between iterations. Many high performance computing applications exhibit this behavior.

In general, high performance computers will benefit from having a communication network 14 for internal communication that has a large minimum bi-section bandwidth and small maximum latency.

The topology of communication network 14 has a major impact on communication latency. The topology determines the number of data links and switches that a message has to pass through between a particular sender and a particular receiver. The number of hops to get through the communication network 14 acts as a multiplier on individual data link and switch latencies in calculating the overall latency.

The topology of communication network 14 also has a secondary impact on bandwidth. The bandwidth of individual data links is a primary influence, but the topology also has an influence by providing multiple paths between senders and receivers. Data can be transmitted more quickly if it can be split between multiple paths.

There has been substantial research on the optimum topologies for high performance computing. Many topologies have been invented. These include:
   direct connection (sometimes referred to as fully meshed);
   bus;
   star;
   ring (including chordal ring);
   various types of multistage interconnect network (MIN);
   hypercube (generally known as k-ary n-cube);
   mesh (generally known as k-ary n-cube);
   toroid (also generally known as k-ary n-cube); and,
   fat tree.

Most of these topologies are not currently used for high performance computing. The direct connection, bus, star, and ring topologies cannot be practically scaled up to handle communications between large numbers of CPUs. Hypercubes and multistage interconnect networks have been used in the past, but are currently out of fashion. A toroid network has advantages over a mesh network and does not cost significantly more to make, so mesh networks are seldom seen. Fat trees and toroids are the two predominant network topologies currently being used in high performance computers.

The fat tree topology is described in C. E. Leiserson *Fat-Trees: Universal Networks for Hardware Efficient Supercomputing*, IEEE Transactions on Computers Vol. C-34, No. 10, pp. 892-901; October 1985. FIG. 3 shows a computer system 30 having nodes 31 interconnected by a network 14 configured as a fat tree. Network 14 is represented as an upside down tree with nodes 31 at the leaves, data links 32 as the branches, and switches 33 where the branches join. A topmost switch 34 is the root of the tree.

Fat trees were designed originally for use in networks implemented inside VLSI chips. In such networks a fat tree can be implemented using variable bandwidth data links. Each switch 33 has a single data link connected to its top side. The bandwidth of the top side data link is at least the sum of the bandwidths of the data links connected to the bottom side of the switch. At each level of the tree, the aggregate bandwidth of all data links is the same as at all other levels. As one goes up the tree, the bandwidth of individual data links increases.

While a fat tree with variable bandwidth data links can be readily implemented in an integrated circuit, it cannot be cost-effectively implemented at the macro scale where switches are complete systems and data links are wire cables. Too many variants of switch design are required. At the scale of normal network equipment, it is more cost-effective for all data links to have the same bandwidth.

This has led to the variant of the fat tree network shown in FIG. 4. Switches at each level are duplicated and additional data links are added. All of the data links can have the same bandwidth. The aggregate bandwidth at each level of the tree still remains the same as at any other level of the tree. The duplication of switches has the side effect that there is the same number of switches at each level.

FIG. 5 shows another example of a fat tree network. Eight port switches are used in a three level fat tree to connect 64 nodes together. All data links have the same bandwidth.

If the switches used to construct a fat tree network have SP ports, a single layer fat tree can be constructed that connects together up to SP/2 nodes. A two layer fat tree can be constructed that connects together up to $(SP/2)^2$ nodes. In general, a fat tree network with L layers can connect together up to $(SP/2)^L$ nodes. Conversely, a fat tree network constructed to connect together N nodes must have at least $\left\lceil \log_{\frac{SP}{2}}(N) \right\rceil$ layers.

The maximum latency occurs in a fat tree network when a packet must travel all the way to a switch 34 at the top of the fat tree before it can descend to the destination node. This requires the packet to pass through every layer twice except for the top layer. The maximum latency for a fat tree network is thus $$2 \times \left\lceil \log_{\frac{SP}{2}}(N) \right\rceil$$

hops.

The minimum bi-section bandwidth of a fat tree occurs for the bi-section which separates the fat tree into a left half and a right half. If there are N nodes connected by a fat tree network, and each is connected to the network by a single data link, the minimum bi-section bandwidth is (N/2)×linkBW, where linkBW is the bandwidth of each link.

In a mesh network, compute sub-systems are interconnected in an D-dimensional grid. FIG. 6 shows a 6×7 2-dimensional mesh network 60 in which nodes 61 are interconnected by data links 62. Each node 61 is connected to its nearest-neighbor nodes. In high performance computer systems, mesh networks are usually designed with equal length sides in order to minimize the maximum latency.

A toroid network is a mesh network that includes supplementary wrap-around data links connecting corresponding nodes on opposite sides of the topology. FIG. 7 shows a 6×6 2-dimensional toroid network 70. FIG. 8 shows a 2×2×2 3-dimensional toroid network 80. In a toroid network, the nodes 81A and 81B that are directly opposite each other on opposite sides of the network are joined together by a wrap-around data link 82. This is done for all possible directly opposite pairs of nodes.

A toroid constructed from a mesh having D dimensions with sides each having length n, can be used to connect together $n^D$ nodes. The individual nodes in a mesh or toroid network can be referenced by assigning them a coordinate based on a Cartesian coordinate system. If the mesh or toroid has D dimensions, each node can be assigned a coordinate with D components. For example a Cartesian coordinate system based on x, y, and z components can uniquely identify each node of a mesh or toroid having 3 dimensions. In this disclosure, numbering starts at 1 for each dimension. If the mesh or toroid has equal length n in each dimension then the numbering of each dimension ranges from 1 to n.

The relative positions of two nodes in a mesh or toroid can be expressed as differences between the coordinates of the two nodes in each dimension. For example, in a 3-dimensional mesh or toroid, one can use the notation $\Delta x_1$, $\Delta x_2$, and $\Delta x_3$ to refer to the differences in position in the three dimensions respectively.

The data links of a mesh or toroid network can be referred to as Cartesian data links, because they follow the grid lines of a Cartesian coordinate system to which the nodes are mapped. A Cartesian data link connects two nodes whose coordinates are different in only one of the D dimensions.

A toroid is a switchless communication network. Nodes are connected directly to one another. This requires that each node have a minimum of 2×D ports to which data links can be connected.

In a mesh network the maximum latency occurs when a sender and receiver are at opposite ends of the longest diagonal of the mesh. The maximum latency of a mesh network is D×(n−1) or $$D \times \left( N^{\frac{1}{D}} - 1 \right)$$

hops.

In a toroid, the maximum latency also occurs on the diagonals but the maximum latency is approximately half that of a similar mesh network, because the wrap-around data links provide a second alternative path for reaching the destination.

The minimum bi-section bandwidth for a toroidal network is experienced when a toroid is bisected into a left half and a right half. If only one data link connects adjacent nodes, the minimum bi-section bandwidth is $2 \times n^{D-1} \times linkBW$. The factor of 2 is due to the wrap-around data links.

FIG. 9 plots maximum latency for both fat trees and toroidal networks as a function of the size of the number of nodes in a computing system. Latency is measured as the number of hops. In both networks the traversal of a data link is considered to be a hop. The maximum latency of a fat tree network depends on both the size of the computing system and the size of the switches being used in terms of switch ports. Curve 93 is for a fat tree constructed using switches each having 8 ports. Curve 94 is for a fat tree constructed using switches having 32 ports.

The maximum latency of a toroid network depends on both the size of the computing system and the number of dimensions of the toroid. Curves 90, 91 and 92 are respectively for toroids having 2, 3 and 4 dimensions. It can be seen that toroids generally have a higher maximum latency than fat tree networks. Maximum latency can only be reduced in a toroid network by using more dimensions. If enough dimensions are used, the maximum latency of a toroid network can be reduced to levels similar to a fat tree. Unfortunately the use of additional dimensions does not really help in practice, because many applications map most naturally to a toroid with 3 dimensions.

FIG. 10 plots minimum bi-section bandwidth as a function of the number of nodes in a computing system. Bandwidth is measured as the number of data links crossing the bi-section. The number of data links can be converted to an actual bandwidth in bits per second by multiplying the number of data links by the bandwidth in bits per second of each data link.

The minimum bi-section bandwidth of a fat tree only depends on the size of the computing system. Curve 100 shows the minimum bi-section bandwidth for a fat tree. The minimum bi-section bandwidth of a toroid network depends on both the size of the computing system and the number of dimensions of the toroid. Curves 101, 102 and 103 are respectively for toroids having 4, 3 and 2 dimensions.

It can be concluded from a comparison of fat tree networks with toroid networks using FIGS. 9 and 10 that a fat tree generally provides superior performance relative to a toroid in terms of lower maximum latency and greater minimum bi-section bandwidth. Despite this, toroidal network topologies are used frequently because many applications model physical phenomena in a 3-dimensional continuum. In such applications, a majority of data communications is between nearest-neighbor nodes. In a toroid, nearest-neighbor nodes are always directly connected. Such applications, which may be called nearest-neighbor applications map well to toroidal topologies.

In contrast, nearest-neighbor applications do not map conveniently to fat tree networks. Nearest-neighbor applications typically treat a number of points arranged in a D-dimensional space. The points interact primarily with their nearestneighbors. Such applications typically map each of the points to a node associated with a processor or group of processors so that calculations affecting the different points may be carried on in parallel. It is impossible to map a large number of points onto nodes without crossing a boundary in the fat tree network that forces network traffic to rise upwards to higher layers of the fat tree. For example, in FIG. 5 it is impossible to allocate a nearest-neighbor application to more than 32 nodes without some of the nodes being on opposite sides of the central divide 50. Communication passing across the central divide of a fat tree network must transit through the uppermost switch layer to reach the other side of the fat tree network. In FIG. 5, this means that some network traffic incurs a latency of 6 hops. As has been mentioned previously, high performance applications tend to run at the speed of the slowest components. With all other factors being equal, the extra latency required to pass network traffic across central divide 50 will reduce the performance of the application.

It can be concluded that for arbitrary patterns of communication fat tree networks offer superior performance to toroid networks due to their lower maximum latency and greater minimum bi-section bandwidth. In the more restricted domain of nearest-neighbor applications, toroids provide superior performance.

Most high performance computing sites run a mix of high performance applications. A significant proportion of these applications are nearest-neighbor applications that benefit from a toroid network. A significant proportion of the remainder require patterns of communication that benefit from a fat tree network.

There remains a need for computer systems which can run effectively a wide range of applications. There is a particular need for such computer systems which combine desirable characteristics of both fat tree and toroid network topologies.

SUMMARY OF THE INVENTION

The invention provides networks that are useful for interconnecting processors or other nodes in high-performance computer systems as well as for other data transmission applications. One aspect of the invention provides a network comprising a plurality of nodes interconnected in a regular D-dimensional array by Cartesian links. D is an integer and $D \geq 2$. The network also comprises a spatially regular arrangement of diagonal data links. For at least some of the diagonal links, in at least one dimension, the two nodes connected by the diagonal link are separated by a distance $\Delta x \geq 2$. In some embodiments, for at least some of the diagonal links, a shortest path between the two corresponding interconnected nodes by way of Cartesian links which link adjacent nodes is at least $D+1$ of such Cartesian links.

In some embodiments each of the nodes in the network is connected by at least one of the diagonal data links to at least one other node in the network. The diagonal links may extend uniformly from each of the nodes. The diagonal links may comprise iso-delta diagonal links.

It can be advantageous to provide diagonal links of different lengths. The network may have sets of diagonal links with the links of each set having a different length. The diagonal links within each set may extend uniformly as described below. In some embodiments the diagonal links are iso-delta diagonal links as described below. The iso-delta diagonal links may include links having lengths of $2^P$ units, for two or more values of P where P is an integer.

In some embodiments, the nodes are arranged in a regular D-dimensional array of super-nodes. Each of the super-nodes comprises a plurality of the nodes. The diagonal links extend uniformly from each of the super-nodes but do not extend uniformly from at least some nodes of the super-nodes.

Further aspects of the invention and features of specific embodiments of the invention are described below.

BRIEF DESCRIPTION OF THE DRAWINGS

In drawings which illustrate non-limiting embodiments of the invention.

DESCRIPTION

Figure 1:
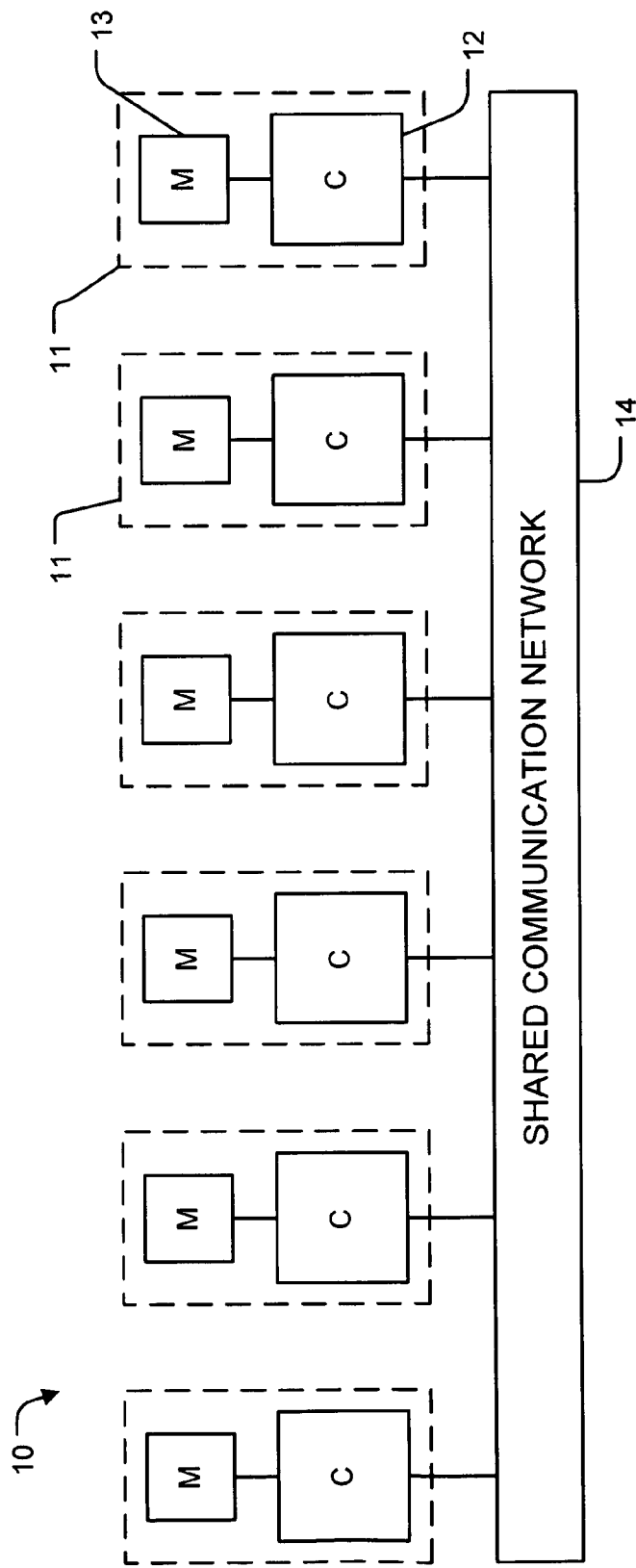
FIG. 1 is a block diagram of a prior art high performance computer system.
Figure 2:
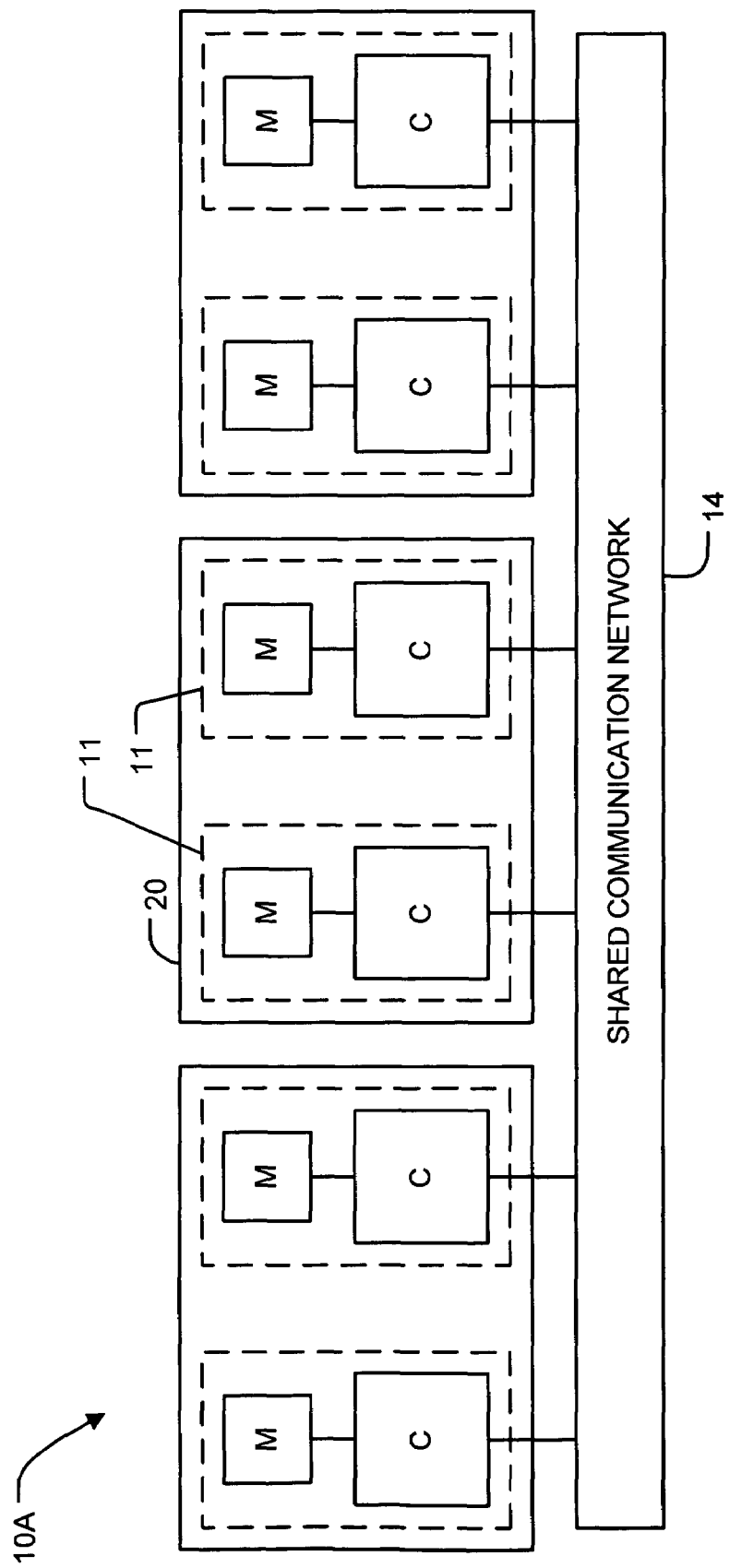
FIG. 2 is a block diagram of a prior art high performance computer system having multiple chassis each accommodating multiple compute subsystems.
Figure 3:
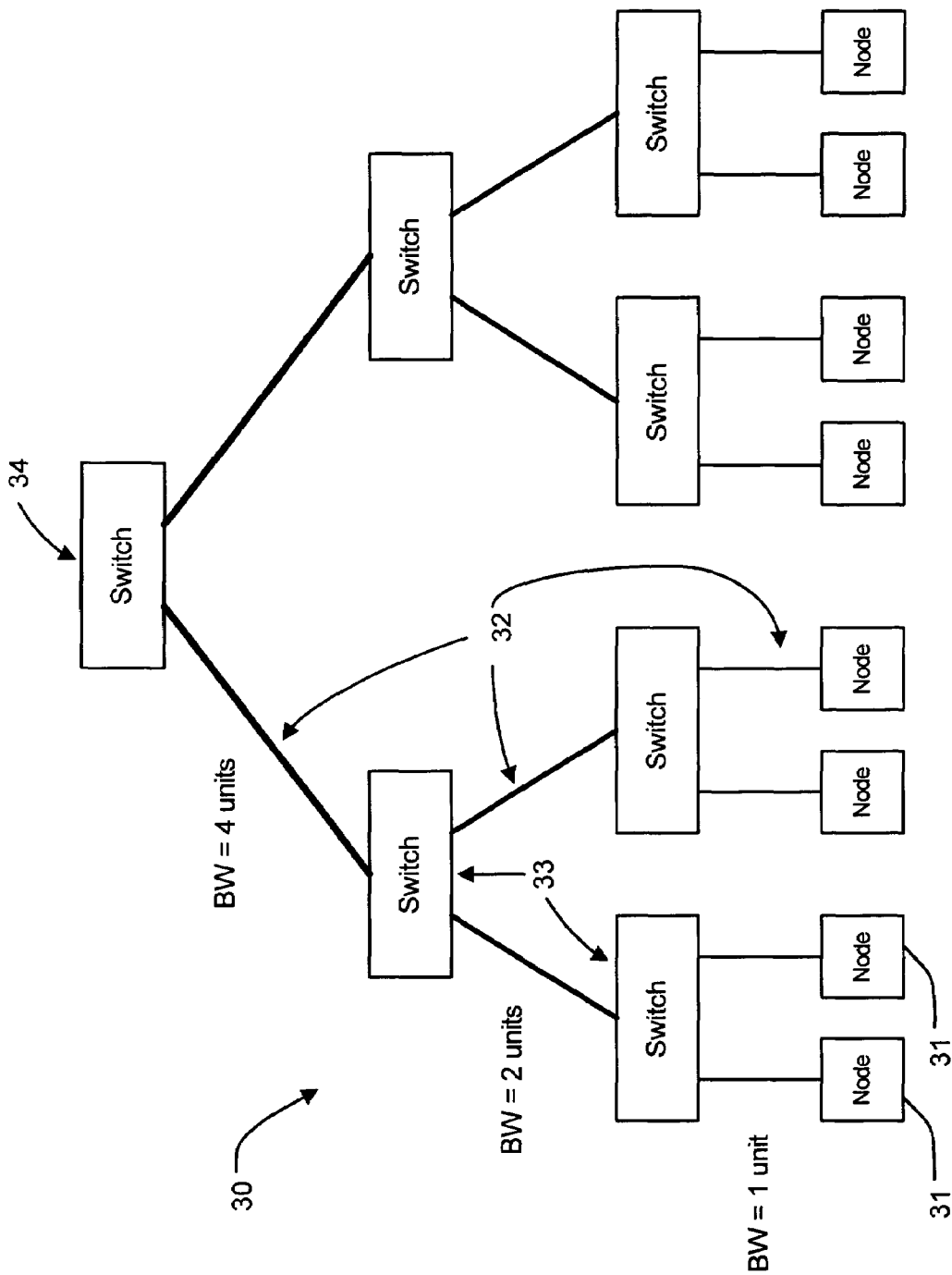
FIG. 3 is a block diagram of a prior art fat tree network topology.
Figure 4:
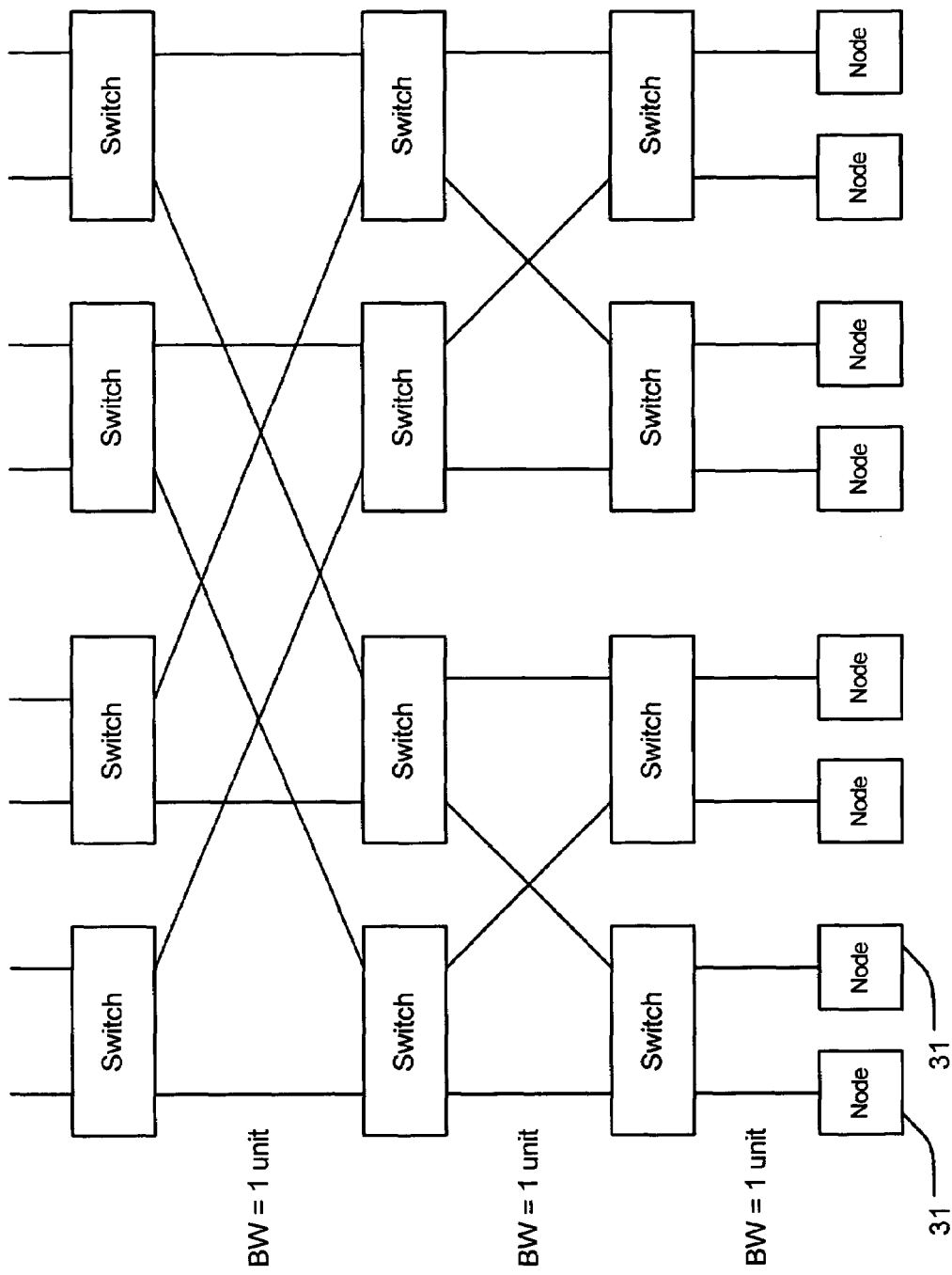
FIG. 4 is a block diagram of a prior art multiprocessor computer system having a fat tree topology implemented with a number of identical switches.
Figure 5:
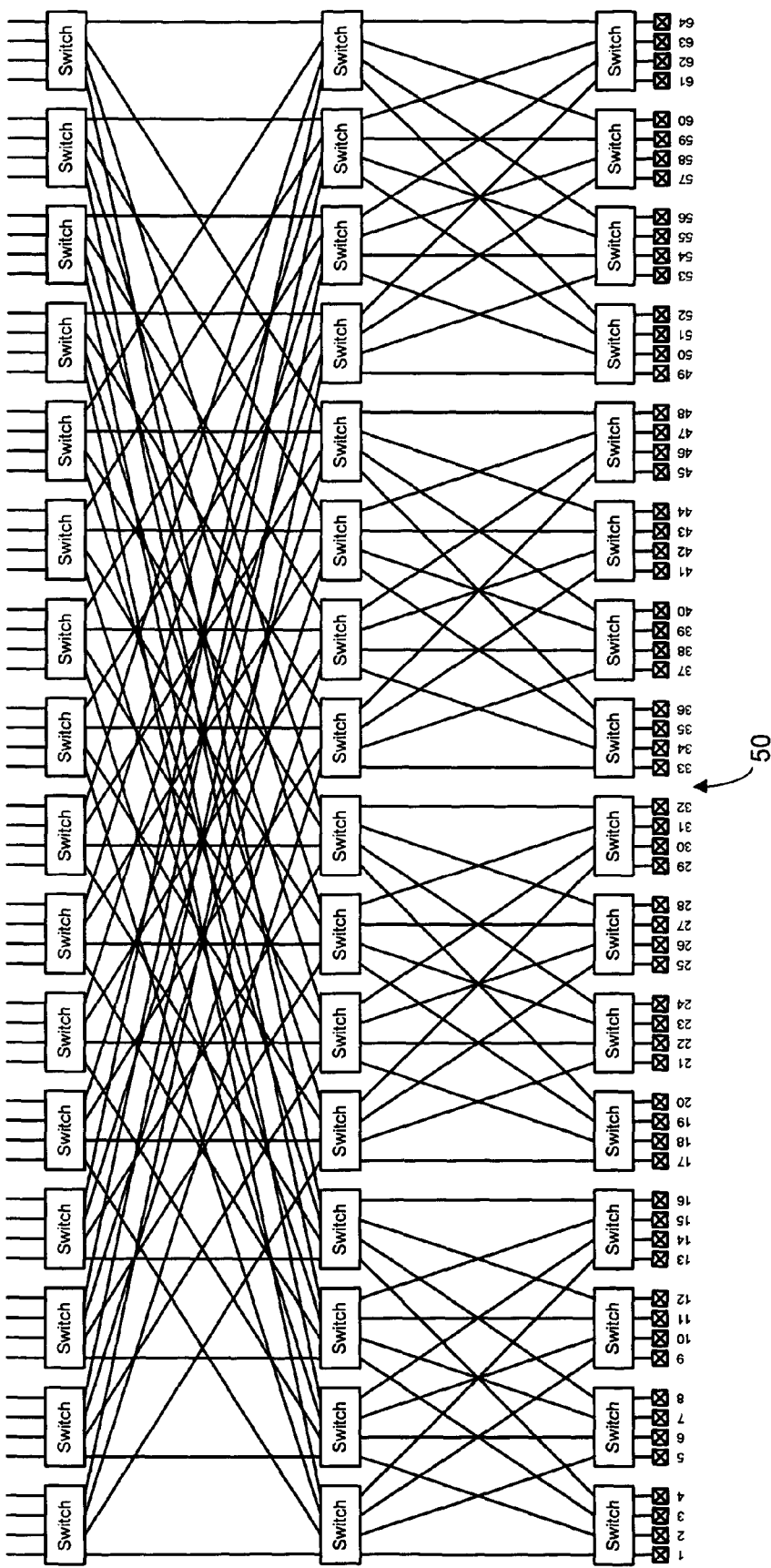
FIG. 5 is a block diagram of a prior art 64 node computer system having a fat tree topology implemented with a number of identical switches.
Figure 6:
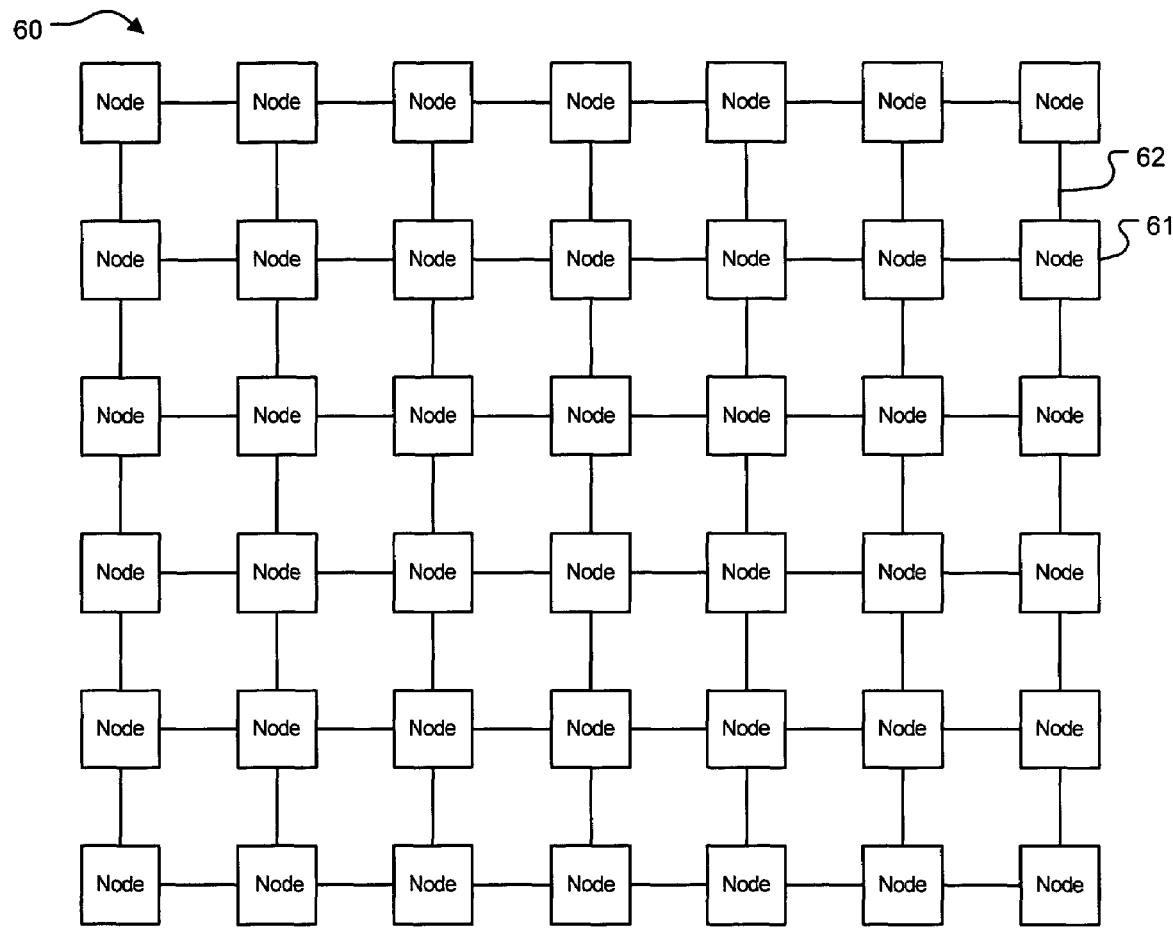
FIG. 6 is a block diagram of a prior art multiprocessor computer system having a 2 dimensional grid topology.
Figure 7:
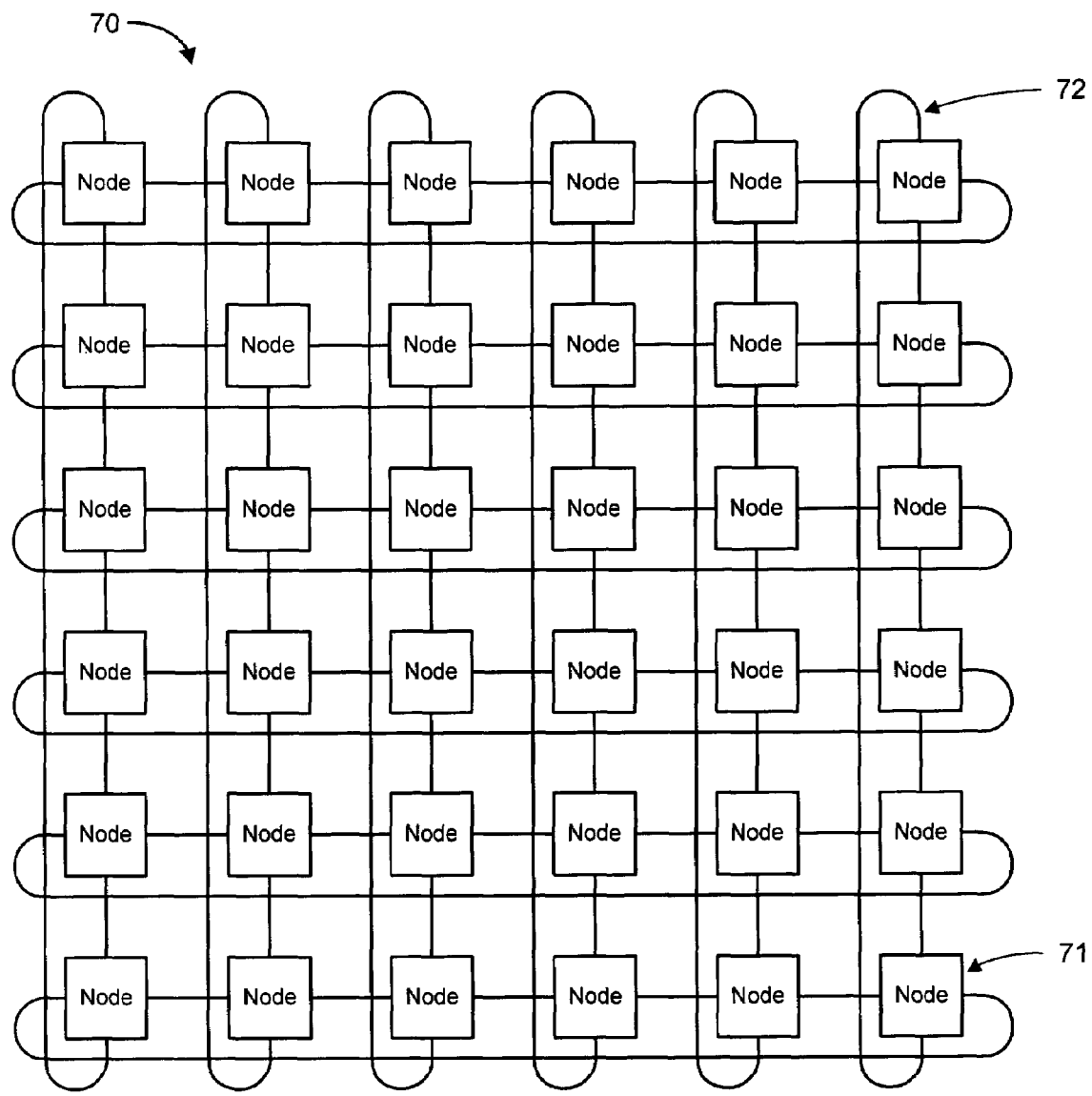
FIG. 7 is a block diagram of a prior art multiprocessor computer system having a 2 dimensional toroid topology.
Figure 8:
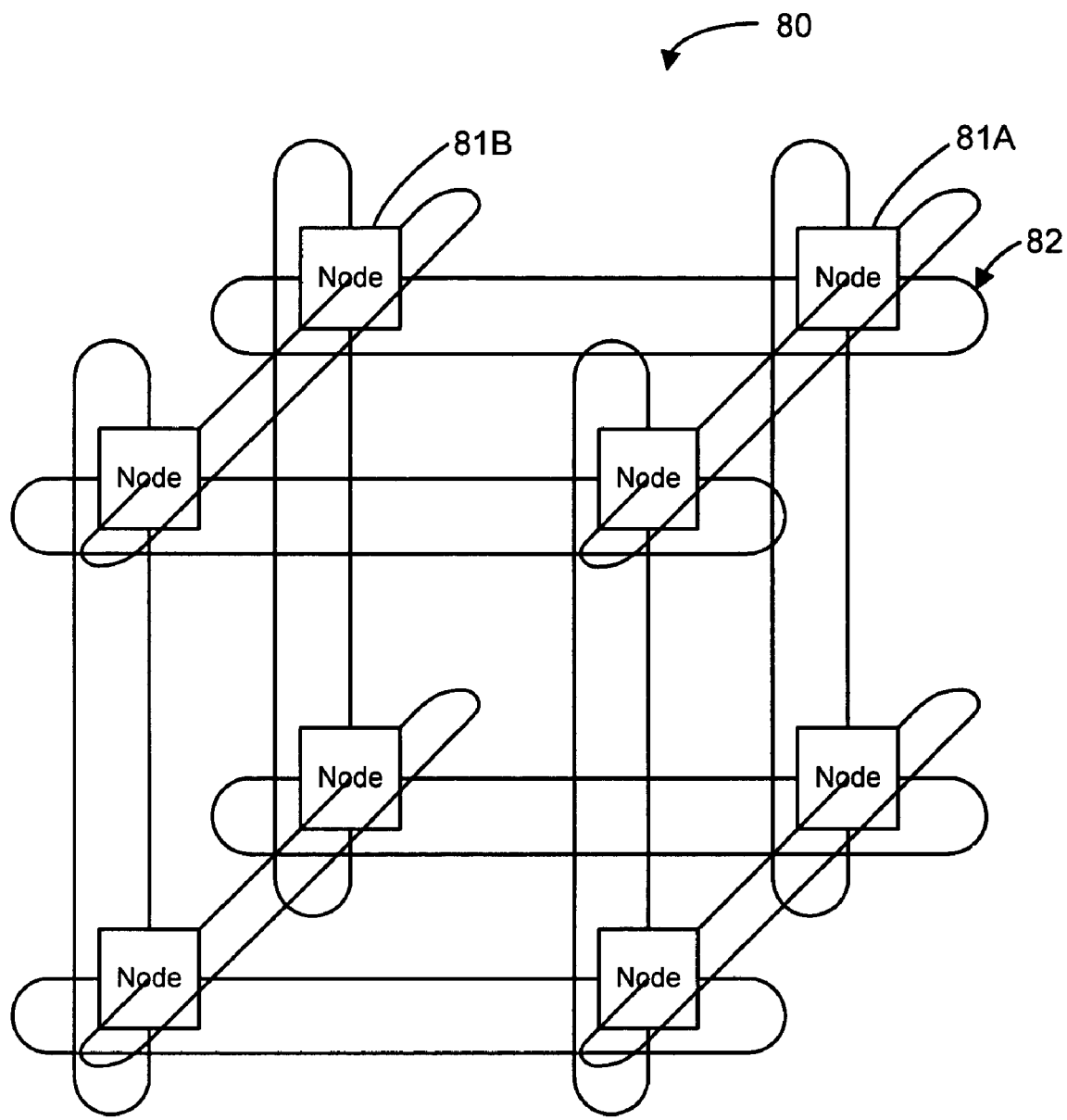
FIG. 8 is a block diagram of a prior art multiprocessor computer system having a 3 dimensional toroid topology.
Figure 9:
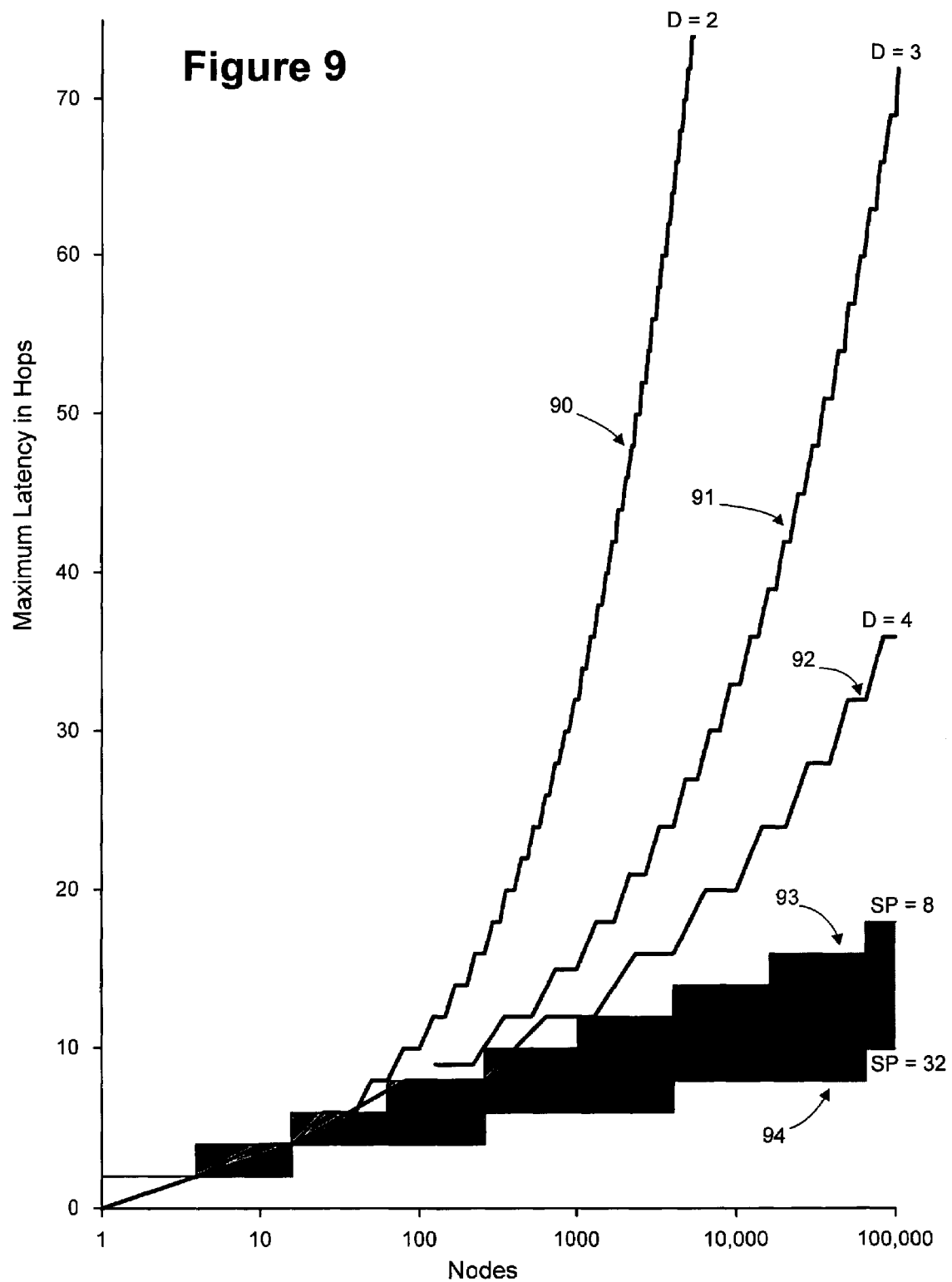
FIG. 9 is a plot of maximum latency as a function of size for computer systems having various topologies.
Figure 10:
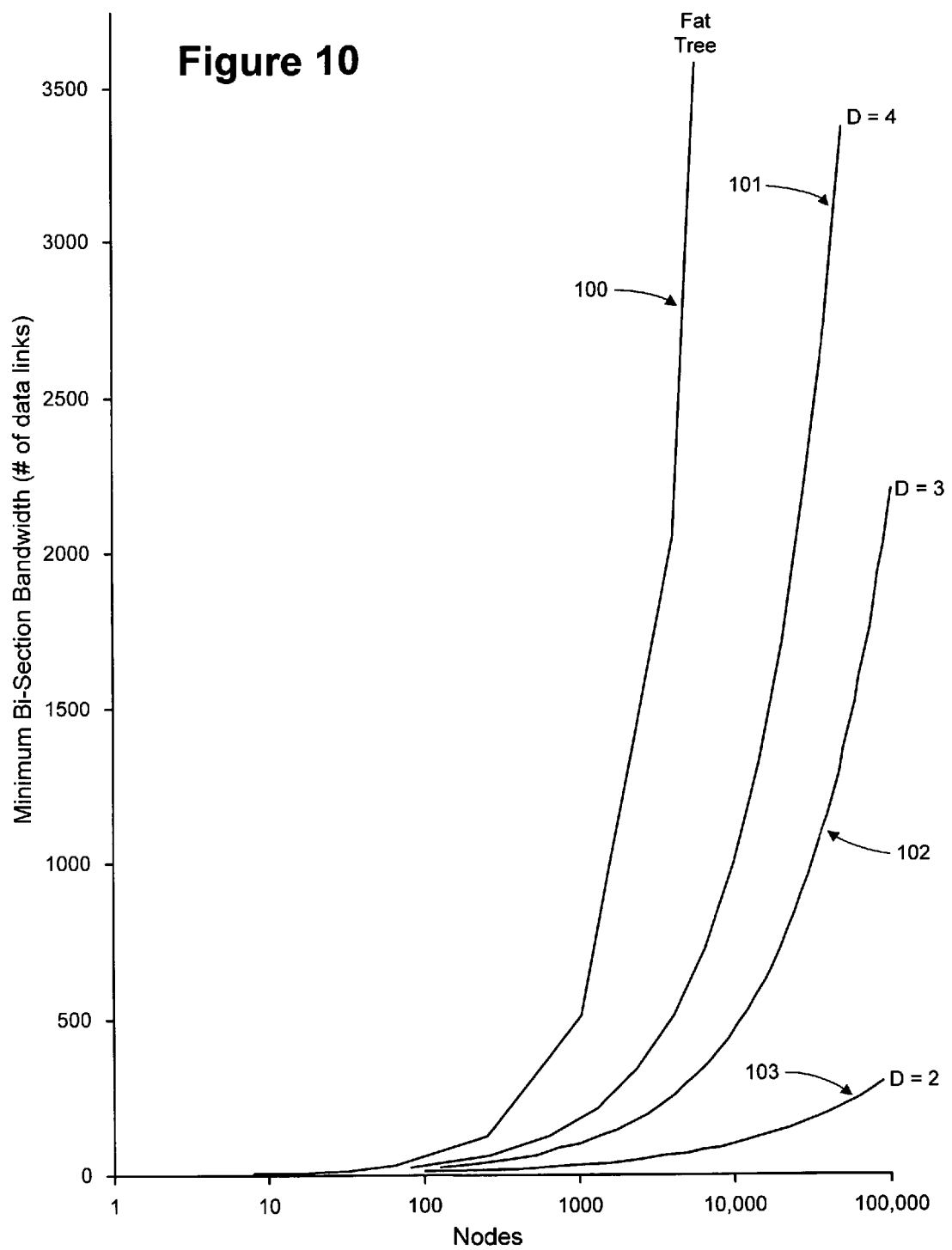
FIG. 10 is a plot of minimum bi-section bandwidth as a function of size for computer systems having various topologies.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to communication networks capable of providing data communications between a number of nodes. The networks of the invention are particularly applicable to providing communications between processors or groups of processors in a multi-processor computer system. The term node is used herein to describe a point to which a communication network can deliver or receive data. A node may be, for example, a CPU, a group of CPUs, a group of compute sub-systems which share a connection to the communication network, a switch, one or more processors interconnected with one or more switches, or the like. In some cases, each node is on a different physical module, such as a chassis which is separate from the chassis on which other nodes are located.

A network according to the invention has an array of nodes arranged in a grid topology. In a grid topology, each node can be mapped to a point in a Cartesian coordinate system of D dimensions where D is two, three, or more. The nodes are connected by Cartesian links, or equivalents thereof, which interconnect nodes having adjacent coordinates (i.e. coordinates for which $\Delta x=1$ for only a single dimension and $\Delta x=0$ for other dimensions). Grid topologies include meshes and toroids of two or more dimensions.

In some cases the grid includes links which wrap around to provide a toroid topology. The wrap-around links connect nodes which have $\Delta x=1$ modulo n, where n is the length of the grid in the dimension in question. In certain embodiments of the invention $n \geq 10$. In certain embodiments of the invention n is the same for all dimensions.

Additionally the nodes are interconnected by a regular pattern of diagonal links. For at least some of the diagonal links, in at least one dimension, the two nodes connected by the diagonal link are separated by a distance $\Delta x \geq 2$. If the nodes have insufficient ports to support the desired number of Cartesian and diagonal data links, the invention provides for the provision of switches in a regular pattern. Each node is connected to the nearest switch ("nearest" means topologically nearest and does not refer to the physical location of a device which performs the switching). Diagonal and/or Cartesian data links interconnect the switches. Some embodiments provide diagonal links of two or more different lengths.

In preferred embodiments of the invention, the same pattern of diagonal data links extend from every node. Diagonal links of different lengths may originate at each node. In preferred embodiments the diagonal links extend uniformly from each node.

The diagonal links may include "iso-delta" diagonal links which meet the "iso-delta" constraint $|\Delta x_1|=|\Delta x_2|=|\Delta x_3|=\ldots=|\Delta x_D|$ where $\Delta x_k$ is the difference in the coordinates of the nodes in the kth Cartesian dimension. $\Delta x$ may be used as a unit of length for iso-delta diagonal links. It would be necessary to traverse one unit of length in every dimension by way of Cartesian links to reach the same node that one could reach by traversing one unit of length on an iso-delta diagonal. The maximum latency in a D-dimensional toroid network occurs for two nodes on an iso-delta diagonal such that, for all i between 1 and D, $\Delta x_i=n/2$.

The examples illustrated in the accompanying drawings show grid topologies having only a few nodes for ease of illustration. Some embodiments of the invention provide networks which interconnect a much larger number of nodes. For example, specific networks according to the invention may interconnect more than 100, 500, 1000, or 5000 nodes.

Figure 11:
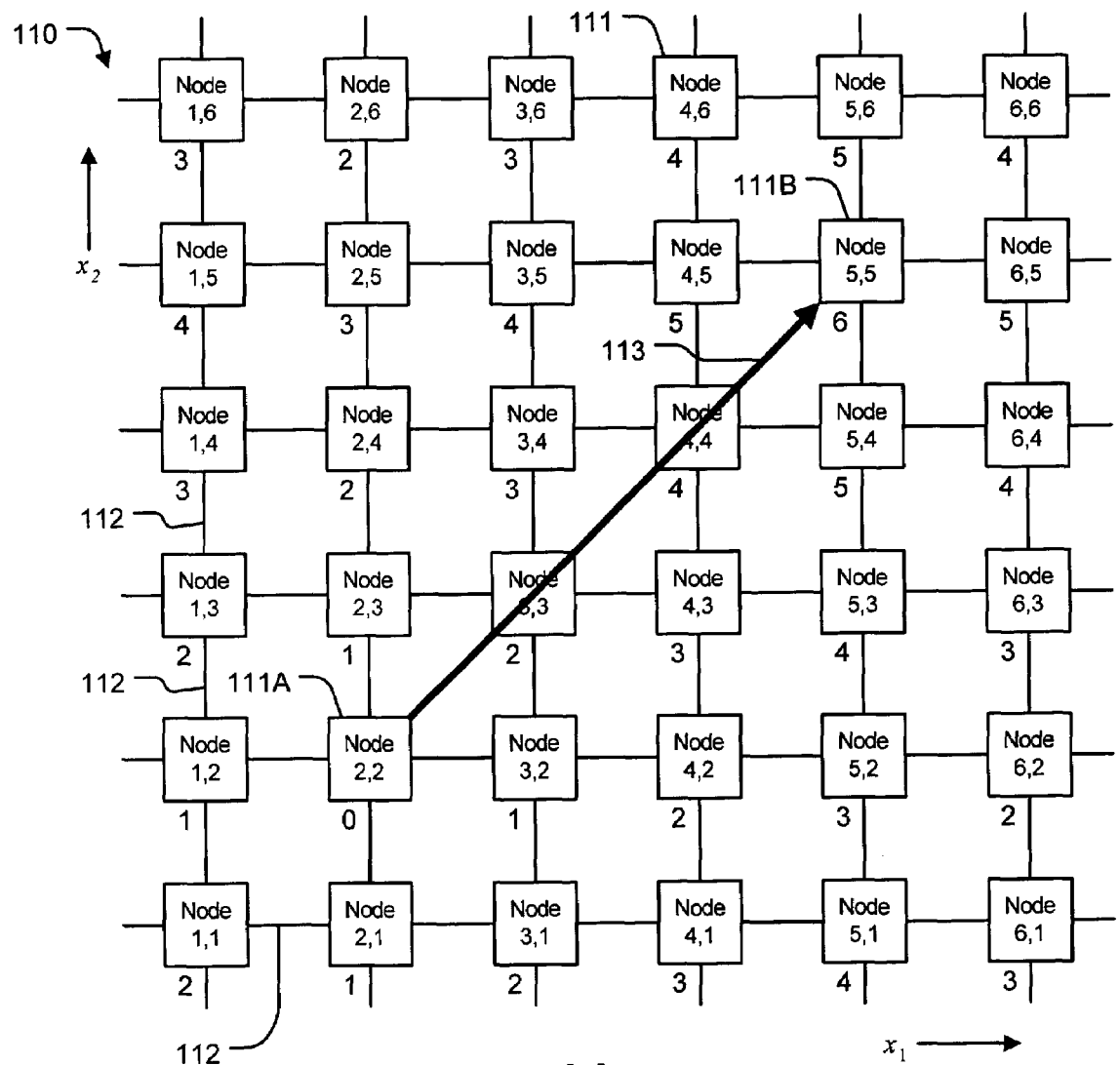
FIG. 11 is a diagram illustrating an iso-delta diagonal link in a computer system having a 2 dimensional grid topology.

In the 2-dimensional 6×6 toroid 110 shown in FIG. 11, each node 111 of toroid 110 is marked with its Cartesian coordinates $x_1, x_2$. The latency to reach each node 111 from node 111A by way of Cartesian links 112 is written beneath each node. Starting at node 111A which has coordinate (2, 2) the maximum latency of 6 is experienced trying to reach node 111B with coordinates (5, 5) as indicated by arrow 113. For this toroid, n=6 and the distance between nodes 111A and 111B is such that $\Delta x_1=\Delta x_2=3$. Nodes located relative to node 111A on other diagonals, that do not meet the iso-delta constraint can be reached in fewer Cartesian hops because fewer units of length have to be traversed on at least one of the dimensions to reach such nodes.

Diagonal data links provided in embodiments of this invention may wrap around a toroidal network in the same manner as Cartesian data links. Where this occurs, it is not necessary to provide diagonal data links longer than half the maximum diagonal distance across the toroid, because such a long data link can always be replaced with a shorter data link that travels in roughly the opposite direction and wraps around the toroid.

Figure 12:
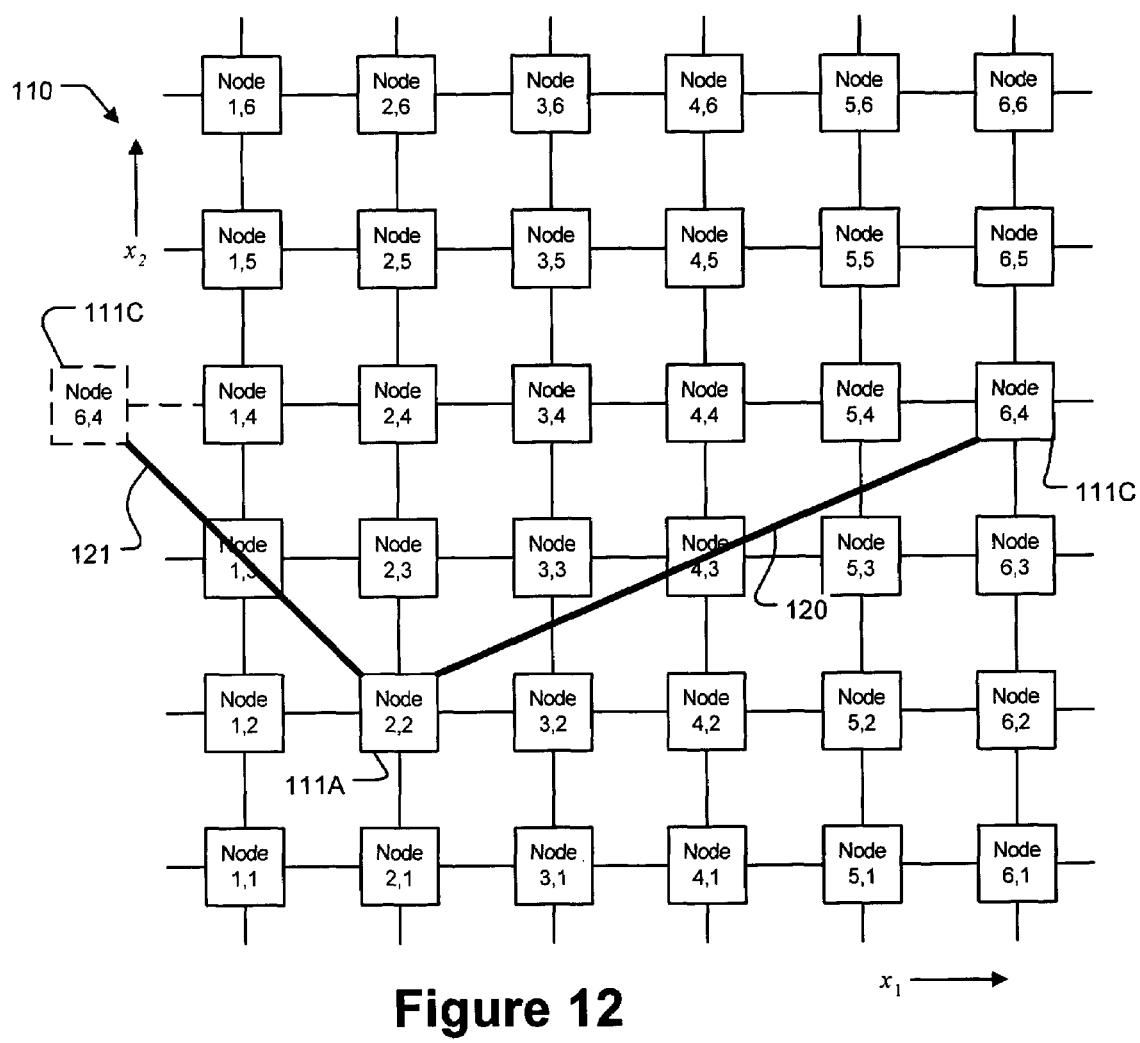
FIG. 12 is a diagram of a 2-dimensional toroidal network which illustrates that a longer diagonal link can be replaced by a shorter diagonal link.

FIG. 12 shows a diagonal link 120 joining nodes 111A and 111C. Link 120 is equivalent to the shorter diagonal link 121.

This invention provides networks having regular diagonal links in addition to Cartesian links. The most benefit per diagonal link is achieved by adding diagonal data links connecting nodes such that the iso-delta constraint is satisfied. Less benefit is achieved by adding diagonal data links connecting nodes that do not meet the iso-delta constraint.

Figure 13A:
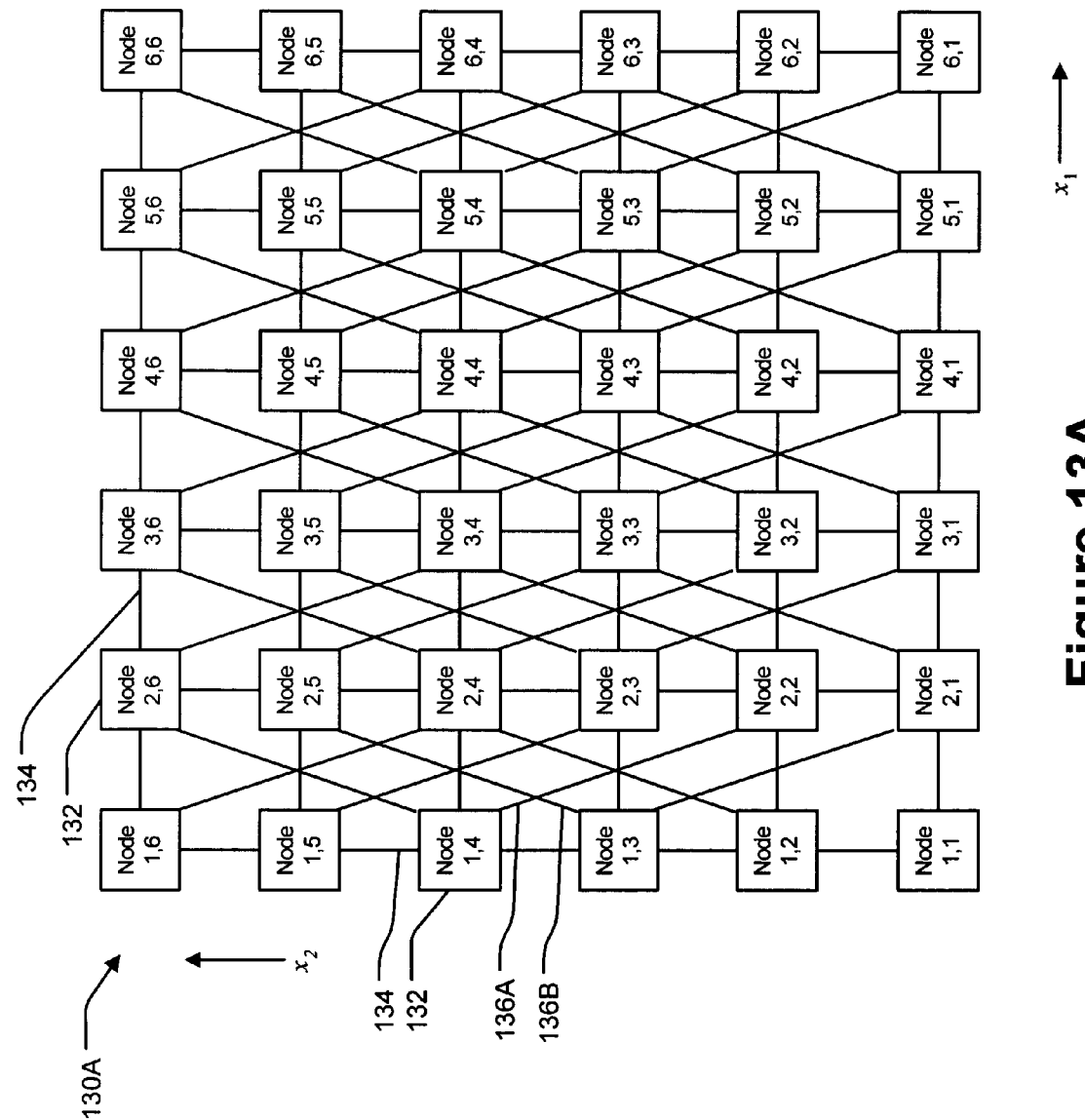
FIG. 13A is a block diagram of a 2-dimensional mesh network having diagonal links according to a simple embodiment of the invention.

FIG. 13A shows a network 130A according to a simple embodiment of the invention. Network 130A has a number of nodes 132 arranged in a 2-dimensional mesh and interconnected by Cartesian links 134 extending along the coordinate directions in the mesh. Nodes 132 are also interconnected by diagonal links 136A and 136B (collectively links 136). In the FIG. 13A embodiment, links 136 are not iso-delta diagonal. Each diagonal link 136 provides bi-directional data communication between two nodes which are three hops apart by way of Cartesian links 134.

Network 130A can be modified by adding wrap-around Cartesian links in one or both dimensions to provide an underlying toroidal topology. Additional links 136 which wrap around may also be provided whether or not the Cartesian links provide a toroidal topology.

Figure 13B:
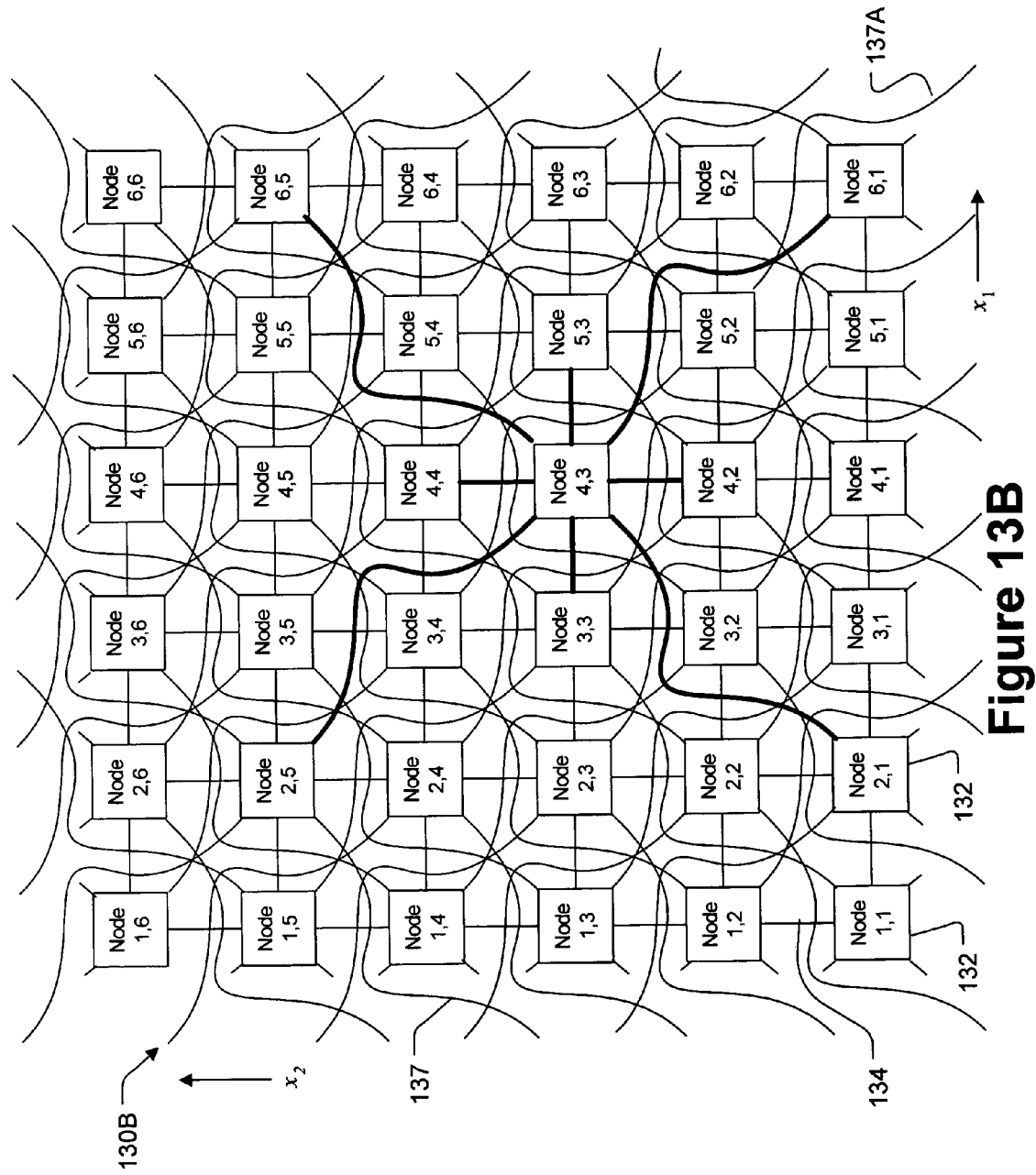
FIG. 13B is a block diagram of a 2-dimensional mesh network having iso-delta diagonal links according to another simple embodiment of the invention.

FIG. 13B shows a network 130B according to another simple embodiment of the invention wherein nodes 132 are connected by iso-delta diagonal links 137 of length two. The links to node (4,3) are emphasized. Node (4,3) has Cartesian links connecting it to each of nodes (4,4), (5,3), (4,2) and (3,3). Node (4,3) has iso-delta diagonal links connecting it to each of nodes (6,5) (6,1), (2,1) and (2,5). Diagonal links 137 wrap around (e.g. diagonal link 137A connects nodes (5,2) and (1,6)).

Figure 14:
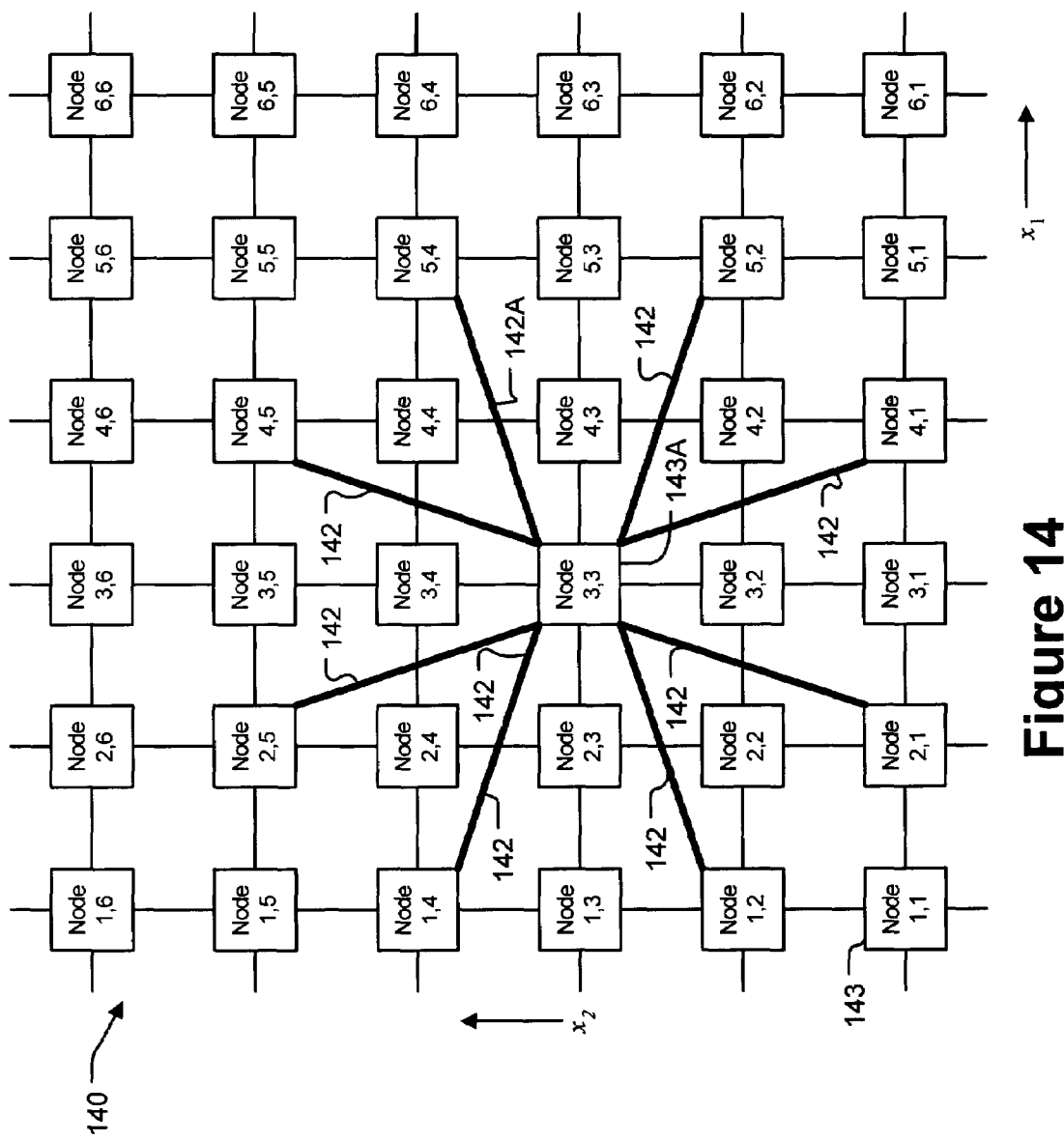
FIG. 14 is a block diagram of a 2-dimensional toroidal network having uniformly extending diagonal links.

It is desirable to provide data links which can reduce latency uniformly in different directions. To do this, one can choose a set of values to be used for $\Delta x_i$, take all unique permutations of assigning each of those values to one of the different $\Delta x_i$'s and, for each permutation take all unique permutations of assigning + or − to each of the values. The result is a set of vectors which describe a set of diagonal links. Such a set of diagonal links may be called "uniform" and may be said to "extend uniformly". Consider as an example the 2-dimensional 6×6 toroidal network 140 shown in FIG. 14. If the set of values for $\Delta x_i$ is given by $\{1, 2\}$ then one can create a set of diagonal links to be added to each node by assigning one of the set of values to each of $\Delta x_1$ and $\Delta x_2$ in all possible ways and then, for each such way, assigning + or − to each of the values in every possible way. FIG. 14 shows diagonal links 142 for all possible combinations of −1 and 1 for $\Delta x_1$ and −2 and 2 for $\Delta x_2$ as well as all possible combinations of −2 and 2 for $\Delta x_1$ and −1 and 1 for $\Delta x_2$. Diagonal links 142 can be provided for every node 143. For clarity, diagonal links are shown in FIG. 14 only for one node 143A.

Any of links 142 of FIG. 14 can be viewed as a specification for the other links 142. For example, link 142A has values of 2 and 1 for $\Delta x_1$ and $\Delta x_2$ respectively. These values can be called "specifying values". The specifying values can be manipulated to generate the component deltas for the remaining data links. Two different manipulations are used. The first manipulation takes all combinations of positive and negative values. Since there are D specifying values, one for each dimension and each specifying value can be used to generate a link extending in either the positive or the negative direction in a particular dimension, there are $2^D$ such combinations of positive and negative values.

Further, different ones of the specifying values can be allocated to different ones of the dimensions. The second manipulation uses every possible permutation of allocating one of the specifying values to each of $\Delta x_1$ and $\Delta x_2$. If there are D specifying values, there are D! ways of allocating these values to $\Delta x_1$, $\Delta x_2$, . . . , $\Delta x_D$. In combination, these two manipulations generate $2^D \times D!$ different diagonal data links where the specifying values are all different. If some of the specifying values are the same then the number of unique diagonal data links is given by:

$$\text{links} = \frac{D! \times 2^D}{\prod_{k}(dup_k!)} \quad (1)$$

where links is the number of unique diagonal links, the specifying values include k duplicated values, and $dup_k$ is the number of duplicates for the $k^{th}$ one of the k duplicated values. Iso-delta diagonal links are a special case where all of the specifying values are the same so that equation (1) reduces to links=$2^D$.

As an example of the application of equation (1), consider an 8-dimensonal toroid and the specifying values 4, 2, 2, 2, 2, 1, 1, and 1. There are two values, 2 and 1, that are duplicated, so k=2. The value 2 is duplicated 4 times and the value 1 is duplicated 3 times. This leads to:

$$\text{links} = \frac{8! \times 2^8}{4! \times 3!} = 71,680$$

To reduce the maximum latency in a toroidal network, it is beneficial to add iso-delta diagonal data links to every node. In a toroid of D dimensions, there are $2^D$ possible directions in which iso-delta diagonal data links can extend from any node. For example, in a 2-dimensional network there are 4 possible directions in which such data links can be sent. In a 3-dimensional network there are 8 possible directions in which iso-delta diagonal data links can be sent. In a 4-dimensional network there are 16 possible directions in which such data links can be sent, and so on. For iso-delta diagonal data links of length 1, these possible directions result from all the possible combinations of the values −1 and +1 for all $\Delta x_i$ where $1 \leq i \leq D$. In preferred embodiments of the invention, iso-delta diagonal data links extend from each node in all possible directions.

Diagonal data links, and especially iso-delta diagonal data links, increase the minimum bi-section bandwidth of a toroid. Like the Cartesian data links, they do this by crossing the bi-section. A Cartesian data link is inefficient at increasing minimum bi-section bandwidth. Each Cartesian data link is oriented along a single dimension (i.e. for a Cartesian data link $\Delta x_i \neq 0$ for only a single dimension i). A Cartesian data link can only contribute to bi-section bandwidth when the dimension along which it is oriented is cut by the bi-section.

In contrast, diagonal data links are defined such that $\Delta x_i \neq 0$ for multiple dimensions. Diagonal data links can contribute to bi-sections of all dimensions for which $\Delta x_i \neq 0$. Iso-delta diagonal data links can contribute to bi-sections of all dimensions. As an example of this, consider the iso-delta diagonal link 151 in the 2-dimensional 6×6 toroidal network 150 of FIG. 15. Because $\Delta x_i \neq 0$ for both the $x_1$ and $x_2$ dimensions, diagonal data link 151 contributes to bandwidth across both of bi-sections 152 and 153.

If diagonal data links are added to a toroidal network in a uniform manner there will generally be multiple diagonal data links crossing any bi-section. It can be seen that each node next to bi-section 153 sends two iso-delta diagonal data links across the bi-section. The result is that bandwidth across bi-section 153 is tripled as compared to a Cartesian toroid lacking iso-delta diagonal links.

Figure 15:
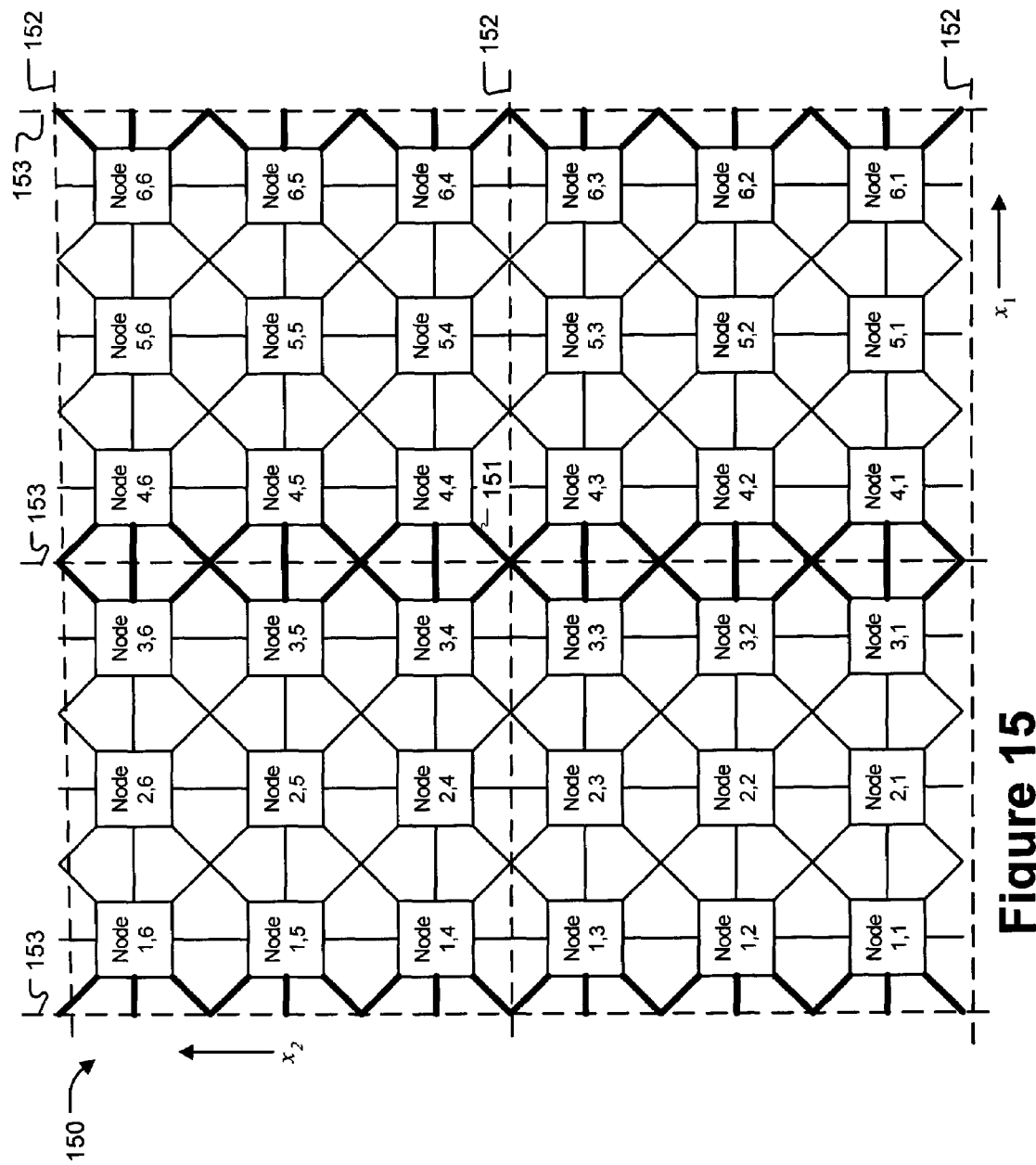
FIG. 15 is a block diagram illustrating the effect of diagonal links on bi-section bandwidth.

In the example shown in FIG. 15, only the nodes next to the bi-section were connected to diagonal data links crossing the bi-section. If longer diagonal data links are added to the toroid in a uniform manner, nodes several layers deep on either side of the bi-section will send diagonal data links across the bi-section.

Figure 16:
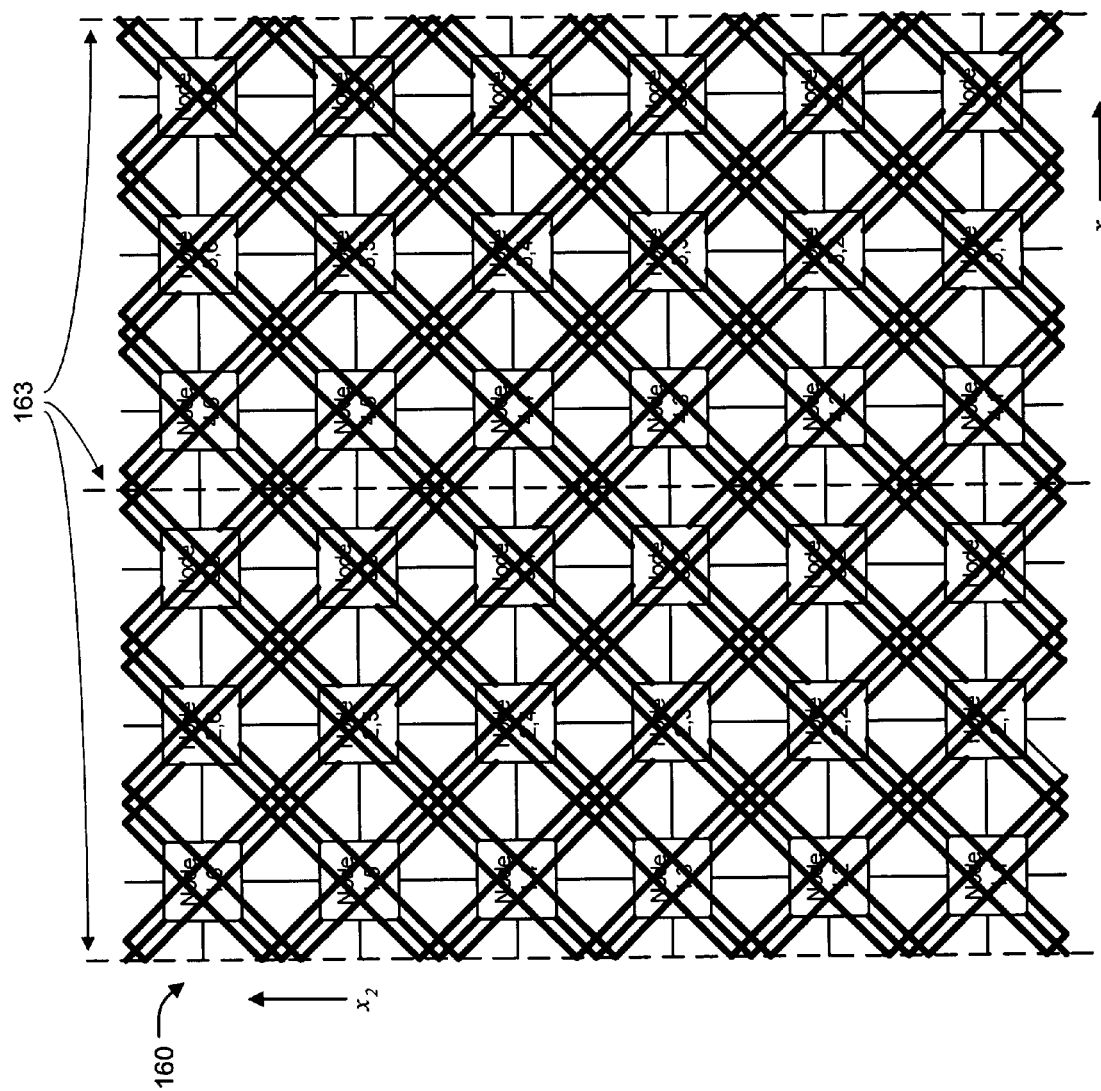
FIG. 16 is a block diagram of a 2-dimensional toroidal network having nodes linked both by Cartesian links and by iso-delta diagonal links of length 3.

FIG. 16 shows a 2-dimensional 6×6 toroid network 160 having iso-delta diagonal data links each three units in length (i.e. $|\Delta x_i|=3$) extending to and from all of its nodes. It can be seen that all of the iso-delta diagonal data links cross the bi-section 163 somewhere along their length. Since each node terminates 4 iso-delta diagonal data links, and each such data link is connected to two nodes, there are 2N iso-delta diagonal data links crossing bi-section 163. The minimum bi-section bandwidth is $$(2 \times N + 2 \times N^{\frac{D-1}{D}}) \times linkBW$$

which is significantly greater than the minimum bi-section bandwidth of an equivalent fat tree network which is given by N/2×linkBW.

The diagonal data links may all have the same length, or they may have different lengths. The minimum bi-section bandwidth and maximum latency of a network will depend in part on the quantity and lengths of the diagonal data links. By adjusting the quantity and lengths of the diagonal data links, any desired minimum bi-section bandwidth within reason can be achieved. To maximize the reduction in latency, the diagonal data links should be of multiple lengths in order to provide lowest-latency access to diverse regions of the network. To minimize the number of diagonal data links required to reduce latency uniformly, preferred embodiments of the invention use iso-delta diagonal data links of various lengths.

It is also beneficial to combine the use of diagonal data links of various lengths with the use of Cartesian data links of various lengths. Empirical evidence suggests that judicious choice of data links can reduce maximum latency to a level that is comparable to the maximum latency of a fat tree network interconnecting an equal number of nodes.

Figure 17:
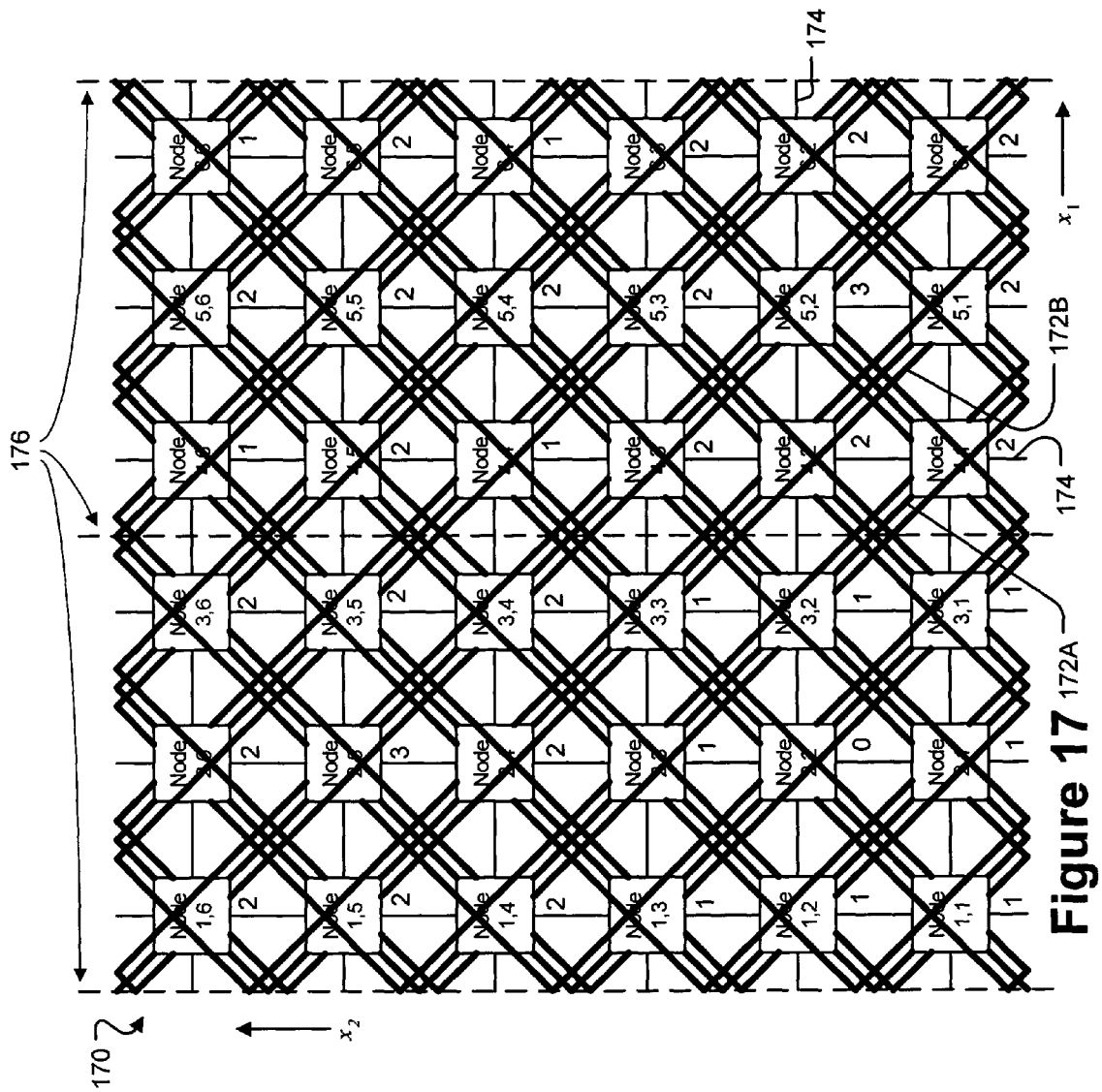
FIG. 17 is a block diagram of a 2-dimensional toroidal network having nodes linked both by Cartesian links and by iso-delta diagonal links of lengths 1 and 2.

For example, FIG. 17 shows a 2-dimensional 6×6 toroidal network 170 in which iso-delta diagonal data links 172A and 172B (collectively links 172) respectively defined by $|\Delta x_i|=1$ and $|\Delta x_i|=2$ for all dimensions extend uniformly from each node. 6 diagonal data links 172 cross bi-section 176 for every Cartesian data link 174 that crosses bi-section 176. Bi-section bandwidth is 7 times what it would be if there were no diagonal data links. In FIG. 17, latencies to reach each node starting from node (2,2) are written under each node. It can be seen by comparing FIG. 17 to FIG. 11 that maximum latency is reduced from 6 hops to 3 hops. For comparison, a fat tree interconnecting 36 nodes using 16 port switches would have a maximum latency of 4 hops.

Different sets of diagonal data links with the data links of each set all having the same length and the lengths of the data links for each of the sets being $2^P$ for some value of P may be provided, In some embodiments $$P = 0, 1, 2, \ldots, \left\lfloor \log_2\left(\frac{n}{2}\right) \right\rfloor.$$

Figure 18:
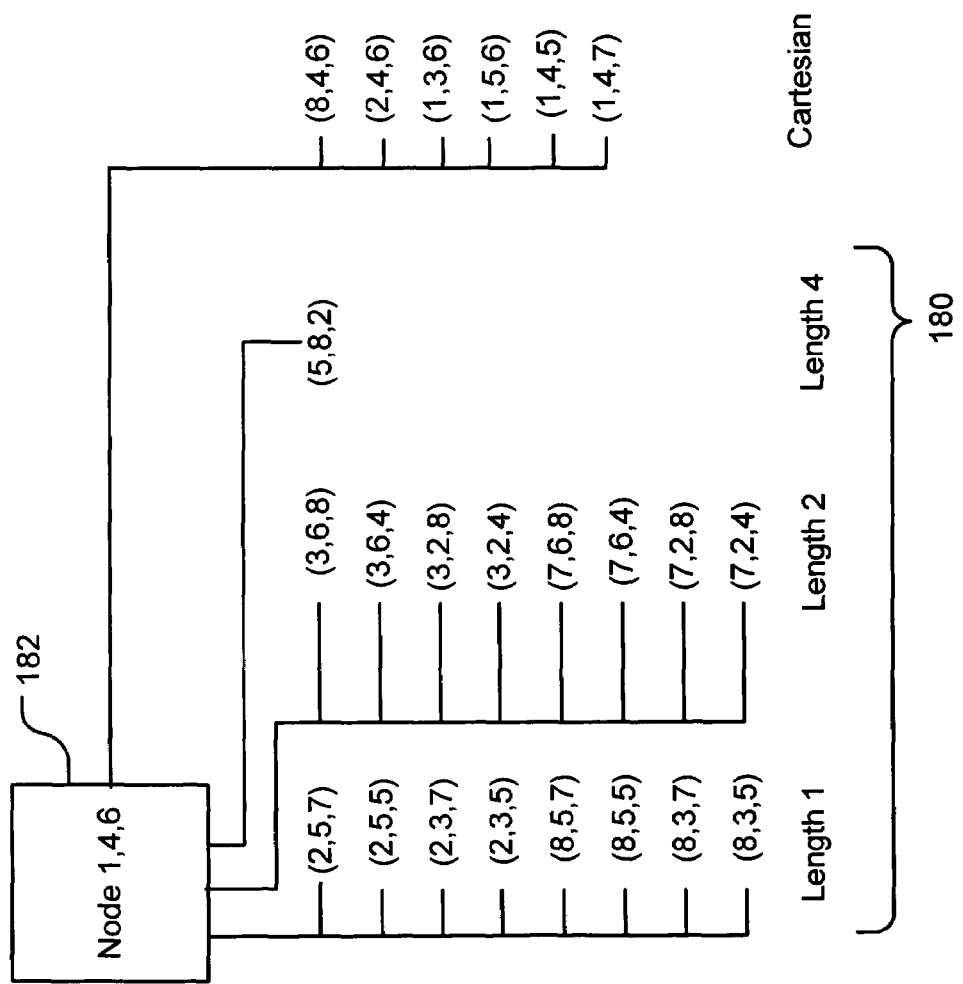
FIG. 18 is a schematic diagram showing iso-delta diagonal and Cartesian links connecting to a particular node of a three-dimensional toroidal network according to an embodiment of the invention.

FIG. 18 shows iso-delta diagonal links 180 connected to a node 182 in a three-dimensional toroidal network having a size of n=8 in each dimension. Node 182 has coordinates (1, 4, 6). Iso-delta diagonal links of lengths 1, 2 and 4 are provided.

Some embodiments of the invention include switches arranged in a regular pattern. In such embodiments, each node may be connected to one or more switches. Diagonal and/or Cartesian data links interconnect the switches. Such embodiments of the invention can use nodes having insufficient ports to support the desired number of Cartesian and diagonal data links. In some cases, nodes may even have insufficient ports to connect nodes together with Cartesian data links. Switches provide a convenient way of expanding the effective port count of nodes. The cost of adding switches is that extra hops are incurred. This can increase latency. Any suitable packet forwarding device, such as a router, can be used in place of a switch.

Figure 19:
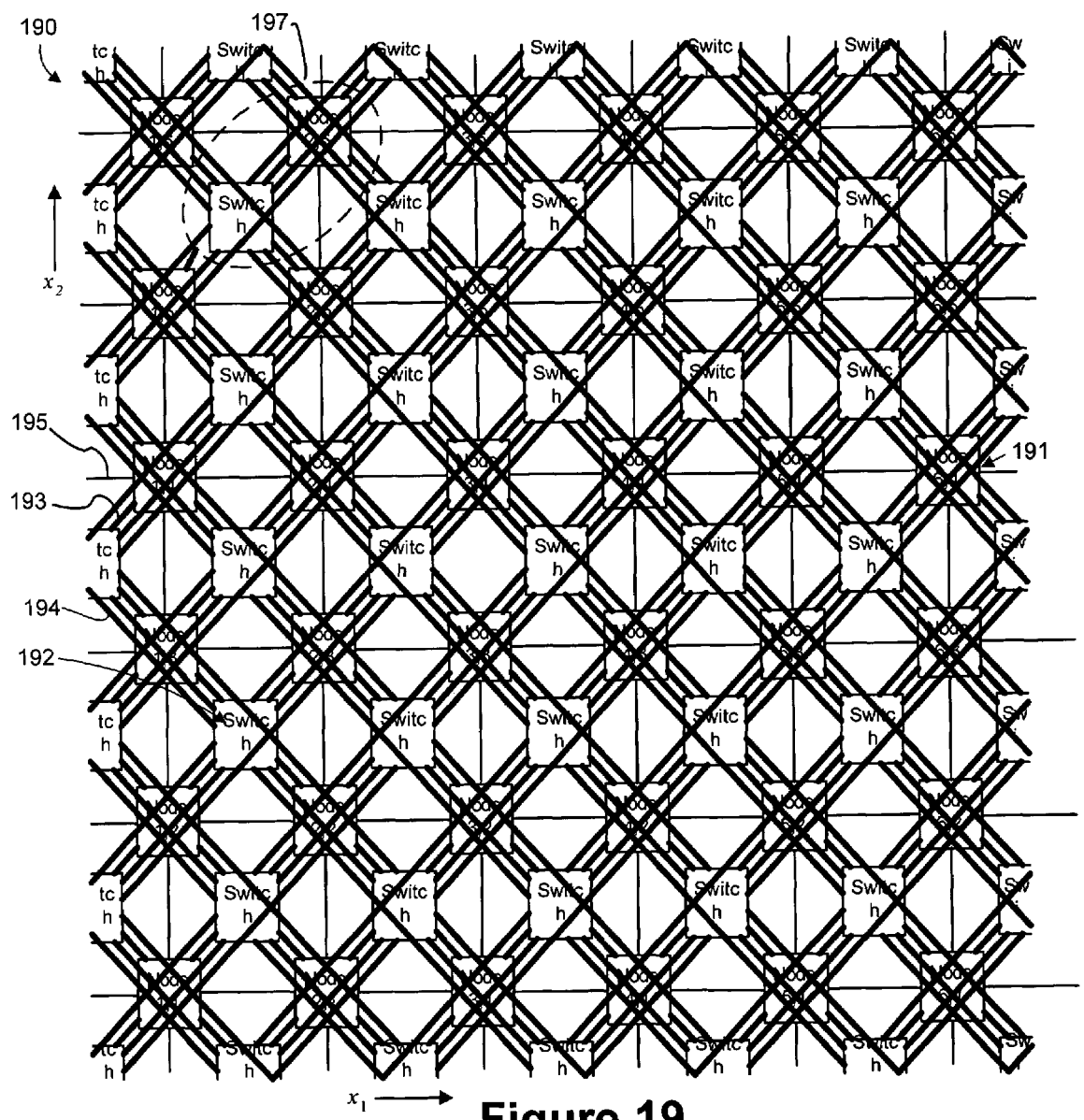
FIG. 19 is a block diagram of a network according to an embodiment of the invention wherein some links pass through switches; and, FIG. 20 is a block diagram of a network according to an embodiment of the invention wherein nodes are clustered into super-nodes and the super-nodes are interconnected by diagonal links.

FIG. 19 shows an example network 190 which includes nodes 191 and switches 192. Switches 192 reduce the number of ports used at each node 191. Nodes 191 are each connected to 4 adjacent switches 192 by links 193. Switches 192 are interconnected by iso-delta diagonal links 194 defined by $|\Delta x_i|=1$ and $|\Delta x_i|=2$ where $\Delta x_i$ is measured relative only to other switches. Nodes 191 are interconnected in a grid topology by Cartesian links 195. There is one switch 192 for every node 191. Switches 192 can be conceptually paired with nodes 191. Each pair 197 of a switch and a node 191 including the link 193 connecting the switch and node can be considered to be itself a node. Pairs 197 are connected by Cartesian links 195 and diagonal links 194. In this example, each node 191 requires only 8 ports to which data links can be connected. Each switch 192 connects to 8 other switches. Without switches 192, each node 191 would require 12 ports to handle 8 iso-delta diagonal data links and 4 Cartesian data links. Switches 192 may optionally be additionally interconnected with other switches 192 by way of Cartesian links (not shown).

In some embodiments of the invention adjacent nodes are grouped into super nodes which each contain a number of nodes. Each super-node is connected to other super nodes by diagonal links. Such embodiments can be implemented with nodes which have a reduced number of ports since it is not necessary to provide a full range of diagonal links to every node.

The nodes in each super-node may be arranged in a hypercube. Consider a toroid having D dimensions and sides which each have a length that is a multiple of 2. Adjacent nodes in the toroid can be grouped into D-dimensional hypercubes. In two dimensions a hypercube is a square, while in three dimensions a hypercube is a cube. If each side of the toroid has the same length n, the number of hypercubes that can be formed is $(n/2)^D$.

Each hypercube has $2^D$ nodes. Each of these nodes is at a corner of the hypercube. Diagonal data links can be used to connect the corners of the super-nodes (hypercubes) together. As noted above, there are $2^D$ different directions in which iso-delta diagonal data links can be sent from a node in D-dimensional toroid. By aggregating nodes into super-nodes, it is only necessary to send iso-delta diagonal data links in one direction from any one node rather than $2^D$ directions. In a network which uses iso-delta diagonal data links, this reduces the number of ports that a node is required to have by a factor of $2^D$. The port requirement is also reduced for non-iso-delta diagonal data links.

Maximum latency is increased in such networks because each node only sends diagonal data links in one direction instead of $2^D$ directions. Nodes must communicate in the remaining directions via the other nodes of the super-node. Extra latency is incurred to get to the other nodes within the super-node. This extra latency can be reduced by judiciously adding diagonal data links inside the super-node to reduce latency.

Figure 20:
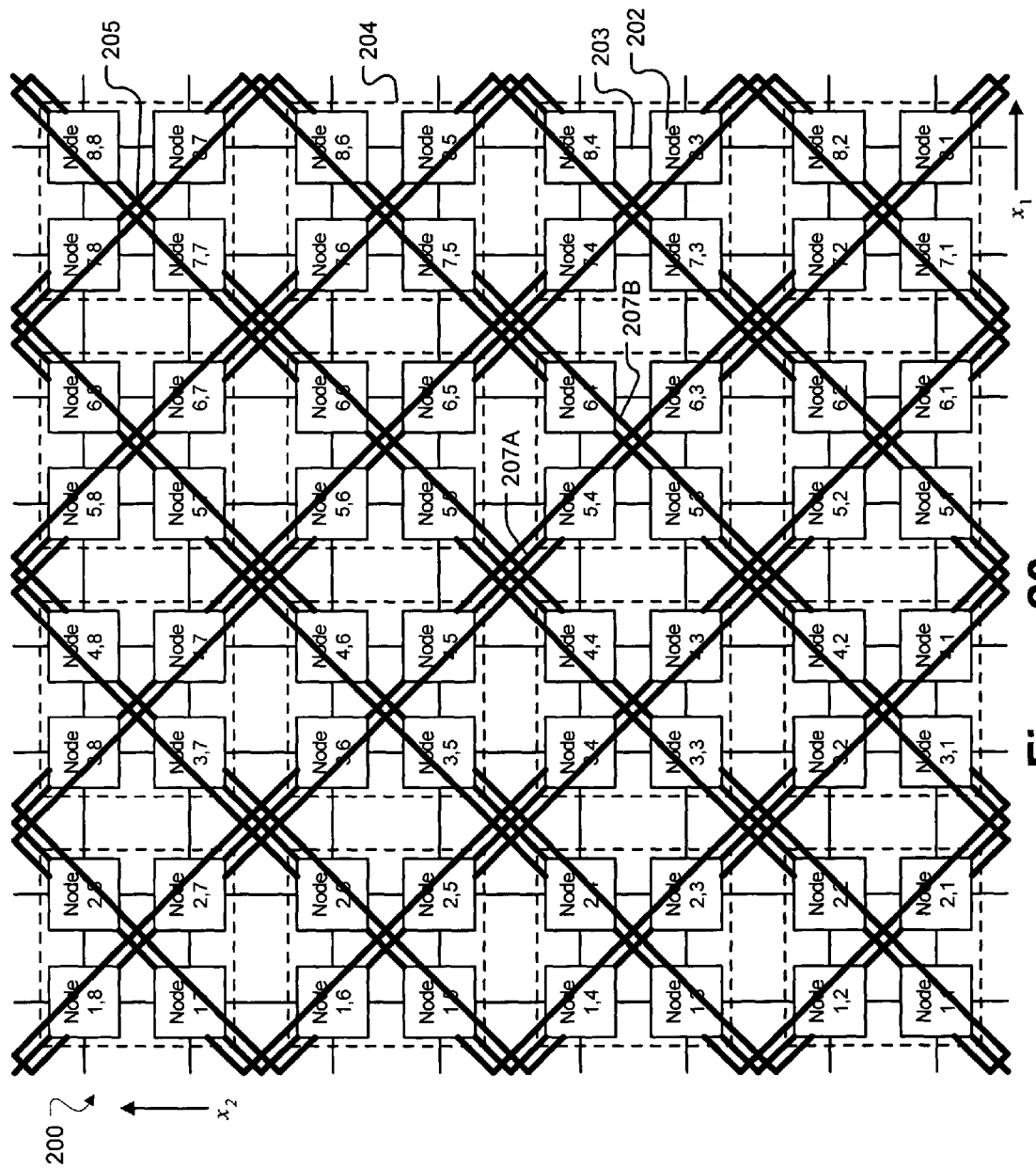

FIG. 20 shows a 2-dimensional 8×8 toroidal network 200. Dashed lines show the grouping of adjacent nodes 202 into super-nodes (hypercubes) 204. The Cartesian links 203 interconnecting the nodes of each super-node are supplemented with diagonal data links 205 which can reduce latency within each super-node 204. Super-nodes 204 are interconnected by iso-delta diagonal data links 207A and 207B defined respectively by $|\Delta x_i|=1$ and $|\Delta x_i|=2$ where $\Delta x_i$ is measured relative to super-nodes 204. If all of nodes 202 were interconnected by iso-delta diagonal data links, each node 202 would be required to have 12 ports. In the network of FIG. 20, each node is only required to have 7 ports.

While the invention has been discussed in terms of toroids, it is equally applicable to mesh networks. Since the longest data links in a mesh have $|\Delta x_i| \leq n$, longer diagonal data links may be provided when the invention is applied in a mesh topology to achieve a desired maximum latency and minimum bi-section bandwidth.

It can be seen that this invention may be applied to provide communication networks which combine the advantages of both toroid networks and fat tree networks. Such networks can provide the low latency and communication relationships of a toroid network for nearest-neighbor type applications. For non-nearest-neighbor applications with other communication patterns (e.g. all-to-all, one-to-all, all-to-one communication patterns), the network provides a small maximum latency and large minimum bi-section bandwidth equal to or superior to that of a fat tree network capable of handling the same number of nodes.

The links between nodes and/or between nodes and switches may be implemented using any suitable mechanism. For example, each of the links may be provided by a physical layer comprising one or more wires, optical fibers or other signal conductors. Data may be carried on such a physical layer according to any suitable protocol. For example, the links may comprise InfiniBand™, Ethernet, Gigabit Ethernet or 10 Gigabit Ethernet links, OC-12 or OC-48 links, SONET, ATM links and so on.

Those skilled in the art will appreciate that suitable routing logic (which may include or consist of static routing tables) is associated with the nodes and/or switches in a network according to the invention so that data can be routed efficiently between nodes. The routing logic may include load balancing logic which may direct data in parallel along different paths connecting the same endpoints in the network.

Where a component (e.g. a link, node, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- While it is typically convenient to make meshes and toroids usually with equal-length sides in order to minimize the maximum latency, this is not required. The invention may also be applied to topologies based upon meshes and toroids with sides of non-equal lengths in different dimensions.
- While the invention has been described in terms of high performance computer systems, it is equally applicable to any communication network based on the mesh or toroid topology.

Accordingly, the scope of the invention is to be construed in accordance with the substance defined by the following claims.

What is claimed is:

1. A network comprising:
a plurality of Cartesian links interconnecting a plurality of nodes in a D-dimensional grid topology, where D is an integer and $D \geq 2$,
a spatially regular arrangement of diagonal links, each of the links interconnecting two of the nodes, wherein for at least some of the diagonal links, in at least one dimension, the two nodes are separated by a distance $\Delta x \geq 2$, and for at least some of the diagonal links, a shortest path between the two corresponding interconnected nodes by way of Cartesian links which link adjacent nodes is at least D+1 of the Cartesian links; and
wherein the diagonal links comprise iso-delta diagonal links, and wherein the iso-delta diagonal links extend uniformly from each of the nodes and the diagonal links comprise at least a first set of links having a first length and a second set of links having a second length different from the first length.

2. A network according to claim 1 wherein the Cartesian links connect the nodes in a toroidal topology.

3. A network according to claim 2 wherein each of the nodes in the network is connected by at least one of the diagonal data links to at least one other node in the network.

4. A network according to claim 3 wherein a pattern of diagonal links extends from each of the nodes and the pattern is the same for all of the nodes.

5. A network according to claim 1 wherein, for a plurality of the nodes, a pattern of diagonal links extends from each of the plurality of the nodes and the pattern is the same for all of the nodes in the plurality of nodes.

6. A network according to claim 1 wherein the diagonal links extend uniformly from each of the nodes.

7. A network according to claim 1 wherein the iso-delta diagonal links include links having lengths of $2^P$ units, for two or more values of P where P is an integer.

8. A network according to claim 7 wherein the iso-delta diagonal links include links having lengths of 1 unit.

9. A network according to claim 8 wherein the iso-delta diagonal links include links having lengths of $2^P$ units, for every value of P such that $2^P \geq n/2$ where n is an integer and the network has a maximum of n nodes in each Cartesian direction.

10. A network according to claim 1 wherein the Cartesian links connect the network in a 3-dimensional topology.

11. A network according to claim 10 wherein the 3-dimensional topology is a toroidal topology.

12. A network according to claim 1 comprising a data processor at each of the nodes, the data processors programmed to exchange data by way of the Cartesian and diagonal links in the network.

13. A network according to claim 1 comprising a plurality of switches, each of the switches connected by links to a plurality of the nodes and to a plurality of other ones of the switches wherein at least some of the diagonal links interconnect two of the switches.

14. A network according to claim 13 wherein the nodes are arrayed in sequence along each of a plurality of Cartesian axes and, for each pair of adjacent nodes along each of the Cartesian axes, each node of the pair is connected to a common one of the switches.

15. A network according to claim 14 wherein each node of the pair is located on at least one other one of the Cartesian axes and the common one of the switches is also connected to a node adjacent to the node of the pair on the other one of the Cartesian axes.

16. A network according to claim 1 wherein the nodes are arranged in a regular D-dimensional array of super-nodes, each of the super-nodes comprising a plurality of the nodes wherein the diagonal links extend uniformly from each of the super-nodes but do not extend uniformly from at least some nodes of the super-nodes.

17. A network according to claim 16 wherein the nodes of each of the super-nodes are organized as corners of a D-dimensional hypercube.

18. A network according to claim 17 wherein the nodes of each of the super-nodes are interconnected by way of both Cartesian and internal diagonal links.

19. A network according to claim 17 wherein the diagonal links connect pairs of the hypercubes and are iso-delta diagonal links.

20. A network comprising a plurality of Cartesian links interconnecting nodes in a regular D-dimensional array, where D is an integer and $D \geq 3$, the network having a length of at least 3 nodes in each of the D dimensions, and comprising a spatially regular arrangement of diagonal data links each interconnecting two of the nodes;
wherein for at least some of the diagonal links, a shortest path between the two corresponding interconnected nodes by way of Cartesian links which link adjacent nodes is at least D+1 of the Cartesian links; and wherein the diagonal links comprise iso-delta diagonal links, and wherein the iso-delta diagonal links extend uniformly from each of the nodes, and the diagonal links comprise at least a first set of links having a first length and a second set of links having a second length different from the first length.

* * * * *